United States Patent [19]
Chikaraishi et al.

[11] Patent Number: 5,578,767
[45] Date of Patent: Nov. 26, 1996

[54] TORQUE SENSOR

[75] Inventors: Kazuo Chikaraishi; Kouichi Satoh, both of Gunma, Japan

[73] Assignee: NSK Ltd., Tokyo, Japan

[21] Appl. No.: 611,878

[22] Filed: Mar. 6, 1996

[30] Foreign Application Priority Data

| Mar. 6, 1995 | [JP] | Japan | 7-070403 |
| Aug. 28, 1995 | [JP] | Japan | 7-240465 |
| Jan. 9, 1996 | [JP] | Japan | 8-018042 |
| Jan. 9, 1996 | [JP] | Japan | 8-018043 |

[51] Int. Cl.$^6$ ..................................... G01L 3/02
[52] U.S. Cl. ............................. 73/862.331; 73/862.334
[58] Field of Search ................ 73/862.331, 862.333, 73/862.334, 862.335, 862.191; 324/207.15

[56] References Cited

U.S. PATENT DOCUMENTS

| 4,356,732 | 11/1982 | Hachtel et al. | 73/862.33 |
| 4,711,134 | 12/1987 | Kita | 73/862.333 |
| 4,805,463 | 2/1989 | Kelledes et al. | 73/862.33 |
| 4,881,414 | 11/1989 | Sakata et al. | 73/862.331 |
| 4,907,460 | 3/1990 | Taniguchi et al. | 73/862.331 |
| 4,996,890 | 3/1991 | Taniguchi et al. | 73/862.33 |
| 5,083,468 | 1/1992 | Dobler et al. | 73/862.331 |
| 5,390,549 | 2/1995 | Dobler et al. | 73/862.334 X |
| 5,394,760 | 3/1995 | Persson et al. | 73/862.331 |
| 5,515,736 | 5/1996 | Kawagoe et al. | 73/862.333 |

Primary Examiner—Richard Chilcot
Assistant Examiner—Elizabeth L. Dougherty
Attorney, Agent, or Firm—Sughrue, Mion, Zinn, Macpeak & Seas

[57] ABSTRACT

A plural number of grooves, circumferentially spaced, are formed in a surrounded portion of a first rotary shaft made of magnetic material. A thin tubular member made of conductive and nonmagnetic material, is integrally coupled with a second rotary shaft in the rotation direction, while surrounding the surrounded portion of the first rotary shaft. A plural number of windows are formed in the tubular member. The windows are arrayed so as to partially overlap with the grooves, respectively. An overlapping area of the window and the groove associated therewith is varied in accordance with a relative turn of the tubular member to the surrounded portion. The portions of the tubular member having the windows formed therein are surrounded by coils. The self-induction electromotive force of each of the coils is measured. A torque is detected on the basis of the self-induction electromotive forces measured. An axial length of each of the windows is longer than an axial length of each of the coils but shorter than an axial length of each of yokes for holding the coils. A circumferential width of each of the grooves of the surrounded portion is wider than that of a raised part of the surrounded portion between adjacent ones of the grooves. A side wall of each of the grooves is raised in a radial direction of the first rotary shaft.

4 Claims, 17 Drawing Sheets

TORQUE SENSOR

BACKGROUND OF THE INVENTION

The present invention relates to a torque sensor for sensing a torque generated in a rotary shaft, and more particularly to a torque sensor which is improved in the sensitivity with a simple construction and in which the axial accuracies of component parts and axial errors in assembling these parts affect little influence to the torque sensing accuracy.

One of conventional torque sensors is described in U.S. Pat. No. 4,805,463. In the conventional torque sensor, an input shaft is coaxially and rotatably coupled with an output shaft. The overlapping portion of those shafts is surrounded by an aluminum tubular member, which is relatively short. The tubular member covering the overlapping portion of the shafts is axially movable with a relative motion of the input shaft to the output shaft. A coil is disposed around the tubular member. A self-induction electromotive force induced in the coil is measured. A relative turn (torque) of the input shaft to the output shaft is detected by using the result of the measurement. When the tubular member is axially moved, the self-inductance of the coil changes. Accordingly, a torque generated in the input and the output shafts can be detected by using the self-induction electromotive force of the coil.

However, a mechanism for converting the relative turn of the first shaft to the second shaft into an axial displacement of the tubular member is indispensable for the conventional torque sensor. This leads to complexity of the sensor structure and to reduction of the reliability of the sensor.

Further, only the axial movement of the aluminum tubular member is insufficient for causing a rapid change of the self-inductance of the coil. To increase the sensitivity of the sensor, it is necessary to increase the number of turns of the coil, for example. This leads to the defect that the sensor size is increased.

Also, there is a conventional power steering system having the following construction. In the power steering system, a torsion bar, which is elastically deformable in the direction of a twist of it, is incorporated into a steering system of a motor vehicle. A relative turn, proportional to a steering torque, is caused between a couple of first and second shafts, which are coupled with each other by the torsion bar. The steering torque is detected by measuring the relative turn. An auxiliary steering torque is generated in accordance with the detected torque. The auxiliary steering torque lessens the load to a driver. A torque sensor of the type in which such a relative turn is measured, is also known. In the torque sensor, an impedance of the coil is varied in accordance with a steering torque, and the torque is detected by measuring the impedance of the coil (see U.S. Pat. No. 4,996,890, for example).

However, in the above-mentioned torque sensor, the coil is fixed to the housing, and the member for varying the impedance of the coil is fixed to the shaft rotatable relative to the housing. Therefore, the axial assembling errors and the manufacturing errors greatly affect the sensing accuracy of the torque sensor. To obtain the satisfactory sensing accuracy, the assembling accuracy and the part accuracy must be high. This results in the defect in the cost of manufacture.

Further, one of the conventional torque sensors is disclosed in U.S. Pat. No. 4,356,732. In the torque sensor, two tubular members are arranged coaxially with each other so that one of the tubular members turns relative to the other in accordance with a torque generated in a rotary shaft. Long grooves and teeth are alternately formed in the outer surface of the inner tubular member. Cutouts are formed in the outer tubular member so that the overlapping areas of the cutouts and the grooves vary with a relative turn of the tubular members. A coil is disposed surrounding the outer tubular member. When the overlapping areas of the cutouts and the grooves vary with a relative turn of the tubular members, the impedance of the coil vary. Therefore, a torque generated in the rotary shaft can be detected by measuring the impedance of the coil.

Indeed, the conventional torque sensor detects a torque generated in the shaft by using the impedance change of the coil. However, in the torque sensor, the change of the impedance is not rapid. Therefore, the sensor sensitivity is not satisfactory.

SUMMARY OF THE INVENTION

In view of the problems of the prior art, an object of the present invention is to provide a torque sensor which increases the sensitivity of the sensor with simple construction.

Another object of the present invention is to provide a torque sensor which is simple in structure and in which the axial accuracies of the component parts and the axial assembling errors affect little influence to a torque sensing accuracy.

To achieve the above objects, according to the present invention, there is provided a torque sensor characterized in that a first rotary shaft and a second rotary shaft, coaxially disposed, are coupled with each other by a torsion bar, a tubular member, made of conductive and nonmagnetic material, is integrally coupled with the second shaft in the rotation direction, while surrounding the circumferential outer surface of the first rotary shaft, at least a surrounded portion of the first rotary shaft, which is surrounded by the tubular member, is made of magnetic material, grooves, axially extended, are formed in the surrounded portion of the first rotary shaft, windows are formed in the tubular member such that the windows are arrayed so as to partially overlap with the grooves, respectively, and an overlapping area of the window and the groove associated therewith is varied in accordance with a relative angular position of the tubular member to the first rotary shaft, the portions of the tubular member having the windows formed therein are surrounded by coils, electromotive force measuring means are provided for measuring electromotive forces induced in the coils, and a torque generated in the first and the second shafts is detected on the basis of the measurement result of the electromotive force measuring means or changes of the impedance of the coils.

Further, in the torque sensor of the present invention, the axial length of each of the windows is longer than the axial length of each of the coils but shorter than the axial length of the yokes for holding the coils thereon. A torque generated in the first and the second rotary shafts are detected by using changes of the impedance of the coils.

Further, in the torque sensor of the present invention, the circumferential width of each of the grooves of the surrounded portion is wider than that of the nongroove part of the surrounded portion.

Further, in the torque sensor of the present invention, the side of each of the grooves is raised in the radial direction of the first rotary shaft.

For example, when it is supposed that the first rotary shaft is an input shaft, and the second rotary shaft is an output shaft, a torque is transmitted from the first rotary shaft to the second rotary shaft through the torsion bar. Thus, the first rotary shaft is turned relative to the second rotary shaft, while twisting the torsion bar. At this time, a relative turn of the first rotary shaft to the tubular member is also caused. Accordingly, the overlapping area of the grooves of the first rotary shaft and the windows of the tubular member is varied.

When the overlapping areas of the grooves and the windows are large, the bottom surfaces of the grooves, not the surface of the surrounded portion, are exposed through the windows. In this state, a relatively large portion of the surface of the surrounded portion of the first rotary shaft made of magnetic material is equivalently covered with nonmagnetic material. Conversely, when the overlapping area is small, the surface of the surrounded portion is exposed through the windows. In this state, a relatively small portion of the surface of the surrounded portion of the first rotary shaft made of magnetic material is equivalently covered with conductive and nonmagnetic material.

In the present invention, the "nonmagnetic material" includes paramagnetic material and some kinds of diamagnetic material. The "magnetic material" means a ferromagnetic material.

The permeability of the nonmagnetic material is approximately equal to that of air, and smaller than that of the magnetic material. When a magnetic flux intersects a conductive material, an "eddy current" to hinder a change of the magnetic flux is generated in the conductive member, and it develops a magnetic field. As a result, the magnetic flux is not uniformly distributed in the member, but is concentrated in the surface region of the member. That is, a called skin effect is caused. Therefore, the portion made of conductive and nonmagnetic material has characteristics to more strongly resist against penetration of the magnetic flux than air.

When the overlapping areas of the grooves and the windows are varied, and a ratio of the exposed area of the surface of the surrounded portion of the first rotary shaft (a ratio of the portion occupied by the magnetic material to the portion occupied by the conductive and nonmagnetic material) is varied, the self-inductance and the mutual inductance rapidly change in accordance with a relative turn of the first rotary shaft to the tubular member since there is a great difference between the permeability of the magnetic material and that of the conductive and nonconductive material.

The electromotive forces of the coils are measured by the electromotive force measuring means. A torque generated in the first and the second shafts is detected on the basis of the result of the measurement since the self-inductance and the mutual inductance change in accordance with a relative turn of the first rotary shaft to the tubular member.

DETAILED DESCRIPTION OF THE INVENTION

Preferred embodiments of the present invention will be described with reference to the accompanying drawings.

FIGS. 1 through 6 show a first embodiment of the present invention. In the embodiment, a torque sensor of the present invention is incorporated into a motor-driven power steering system for a motor vehicle.

Figure 1:
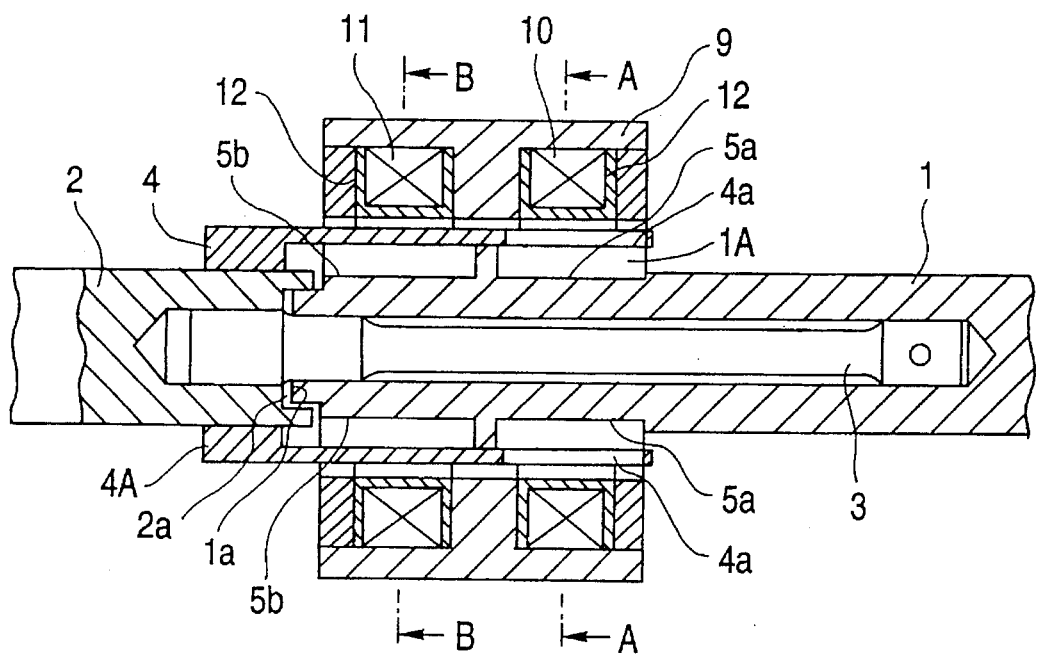
FIG. 1 is a longitudinal sectional view showing the construction of a first embodiment of a torque sensor according to the present invention.

The construction of the torque sensor will first be described. As shown in FIG. 1 which is a cross sectional view showing a portion of a vehicle steering system, an input shaft 1 and an output shaft 2 are arranged coaxially and rotatably. These shafts are coupled with each other by a torsion bar 3. The input shaft 1 and the output shaft 2 are made of magnetic material such as iron.

A steering wheel (not shown) is firmly coupled with the right end (as viewed in FIG. 1) of the input shaft 1, while being arranged in the rotation direction of the shafts. A pinion shaft, which partially forms a known rack-and-pinion type steering system, is, for example, coupled with the left end (as viewed in FIG. 1) of the output shaft 2. With this construction, a steering force that is generated when a driver turns the steering wheel, is transmitted to the wheels to be steered (not shown), by way of a route of the input shaft 1, the torsion bar 3, the output shaft 2, and the rack-and-pinion type steering system.

A groove 2a is formed in the end face of the output shaft 2, which is closer to the input shaft 1. The groove 2a is extended further in the radial direction from the portion into which the torsion bar 3 is inserted. The groove 2a receives a protruded portion 1a protruded from the end face of the input shaft 1, which is closer to the output shaft 2. The width (dimension when viewed in the circumferential direction) of the groove 2a is slightly wider than that of the protruded portion 1a. With this, a relative turn of the input shaft 1 to the output shaft 2 is limited within a predetermined angular range (e.g., approximately ±5°).

The output shaft 2 receives a rotation force of a motor (not shown), electrically driven, through a worm gear, for example. That is, by properly controlling the direction and the amplitude of a drive current fed to the motor, an auxiliary steering torque having a desired direction and a desired magnitude is applied to the output shaft 2.

A large diameter portion 1A is formed on the circumferential outer surface of a portion of the input shaft 1, which is located closer to the output shaft 2. The large diameter portion 1A is arranged coaxially with the input shaft 1. A thin tubular member 4 is disposed around and in close proximity to the circumferential outer surface of the large diameter portion 1A.

The tubular member 4 is made of conductive and non-magnetic material (e.g., aluminum). A small diameter portion 4A is provided on the inner side of the left end portion (in FIG. 1) of the tubular member 4. The small diameter portion 4A receives the output shaft 2 while being coaxial with the latter. With this coupling, the tubular member 4 is integrally coupled with the output shaft 2 in the rotation direction.

A plural number (six in this embodiment) of windows 4a, ..., 4a, shaped rectangular, are formed in a part (located farther from the small diameter portion 4A) of the thinned portion of the tubular member 4, which surrounds the large diameter portion 1A. Those windows are equidistantly arrayed in the circumferential direction. Similarly, a plural number (six in this embodiment) of windows 4b, ..., 4b, shaped rectangular (having the same shape as the windows 4a), are formed in a part (located closer to the small diameter portion 4A) of the thinned portion of the tubular member 4. Those windows are equidistantly arrayed in the circumferential direction, and shifted from the windows 4a, ..., 4a by 180° of phase when viewed in the circumferential direction.

Specifically, the circumferential surface of the tubular member 4 is equally divided into twelve (12) segments. These segmental areas are opened every other segmental area, to thereby form rectangular holes 4a, ..., 4a. To form the windows 4b, ..., 4b, parts of the tubular member 4 corresponding to those segmental areas between the adjacent windows 4a are opened.

A plural number (six in this embodiment) of grooves 5a, ..., 5a are formed in a portion (inside the windows 4a, ..., 4a) of the large diameter portion 1A (surrounded by the tubular member 4) of the input shaft 1. The grooves, when viewed from above, are each shaped rectangular (equal in shape to the windows 4a). Those grooves are equidistantly arranged in the circumferential direction. Similarly, a plural number (six in this embodiment) of grooves 5b, ..., 5b are formed inside the windows 4b, ..., 4b. The grooves, when viewed from above, are each shaped rectangular (equal in shape to the grooves 5a). Those grooves are also equidistantly arranged in the circumferential direction.

Figure 3:
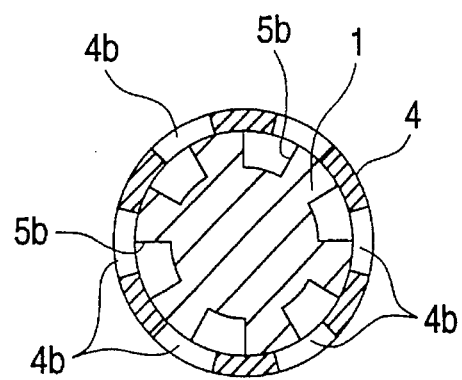
FIG. 3 is a cross sectional view showing the tubular member, taken on line B—B in FIG. 1.
Figure 2:
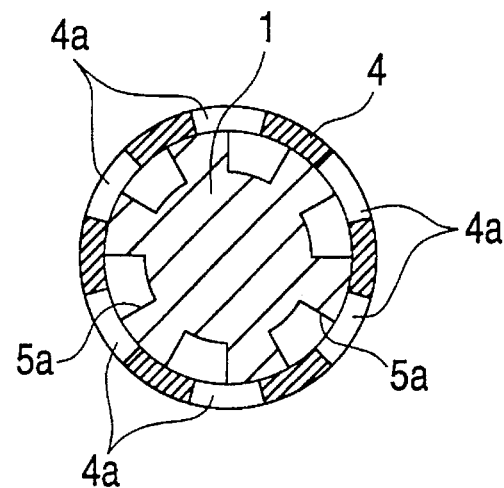
FIG. 2 is a cross sectional view showing a tubular member used in the torque sensor, taken on line A—A in FIG. 1.
Figure 4:
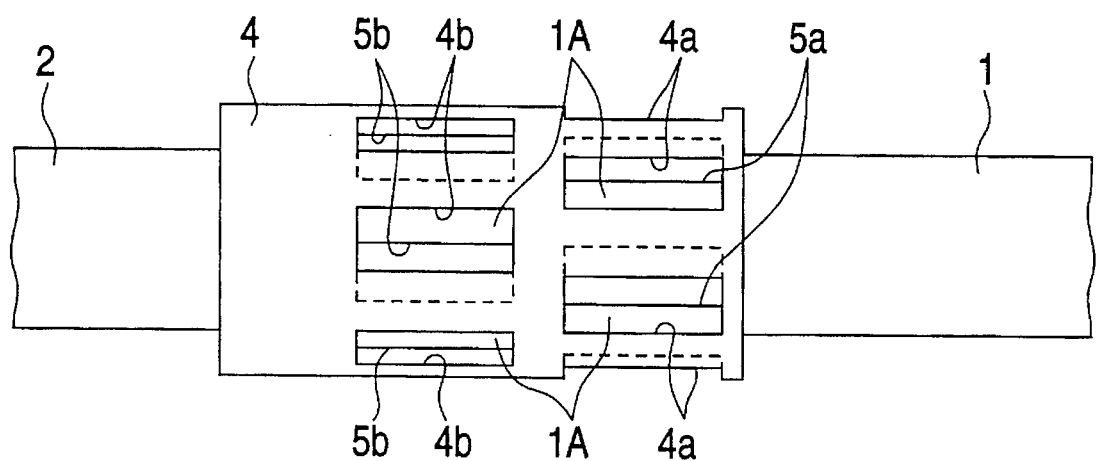
FIG. 4 is a front view of an assembly of the input and the output shafts, and the tubular member fastened thereto.

The tubular member 4 and the grooves 5a are positioned such that when a relative turn of the input shaft 1 to the output shaft 2 is not caused (the steering torque is zero (0)), the half of each window 4a overlaps with the half of each groove 5a, as shown in FIG. 2 as a cross sectional view of the input shaft 1 and the tubular member 4, which is taken on line A—A in FIG. 1. Accordingly, when the steering torque is 0, the half of each window 4b also overlaps with the half of each groove 5b, as shown in FIG. 3 as a cross sectional view of the input shaft 1 and the tubular member 4, which is taken on line B—B in FIG. 1. The windows 4a and the windows 4b are out of phase or shifted from each other by 180° of phase. Then, an overlapping state of the window 4a and the groove 5a is opposite to an overlapping state of each window 4b and each groove 5b with respect to the associated groove, as seen from FIGS. 2 and 3, and FIG. 4 which is a front view of the assembly of the input shaft 1, the output shaft 2, and the tubular member 4 fastened thereto.

The tubular member 4 is surrounded by a yoke 9, made of magnetic material, for supporting a bobbin 12 therein. The bobbin 12 is wound by coils 10 and 11, which have equal technical specifications. The coils 10 and 11 are disposed coaxially with the tubular member 4. The coil 10 is wound around the bobbin 12 so as to surround the portion of the tubular member 4 where the windows 4a, ..., 4a are formed. The coil 11 is wound around the bobbin 12 so as to surround the portion of the tubular member 4 where the windows 4b, ..., 4b are formed.

Figure 5:
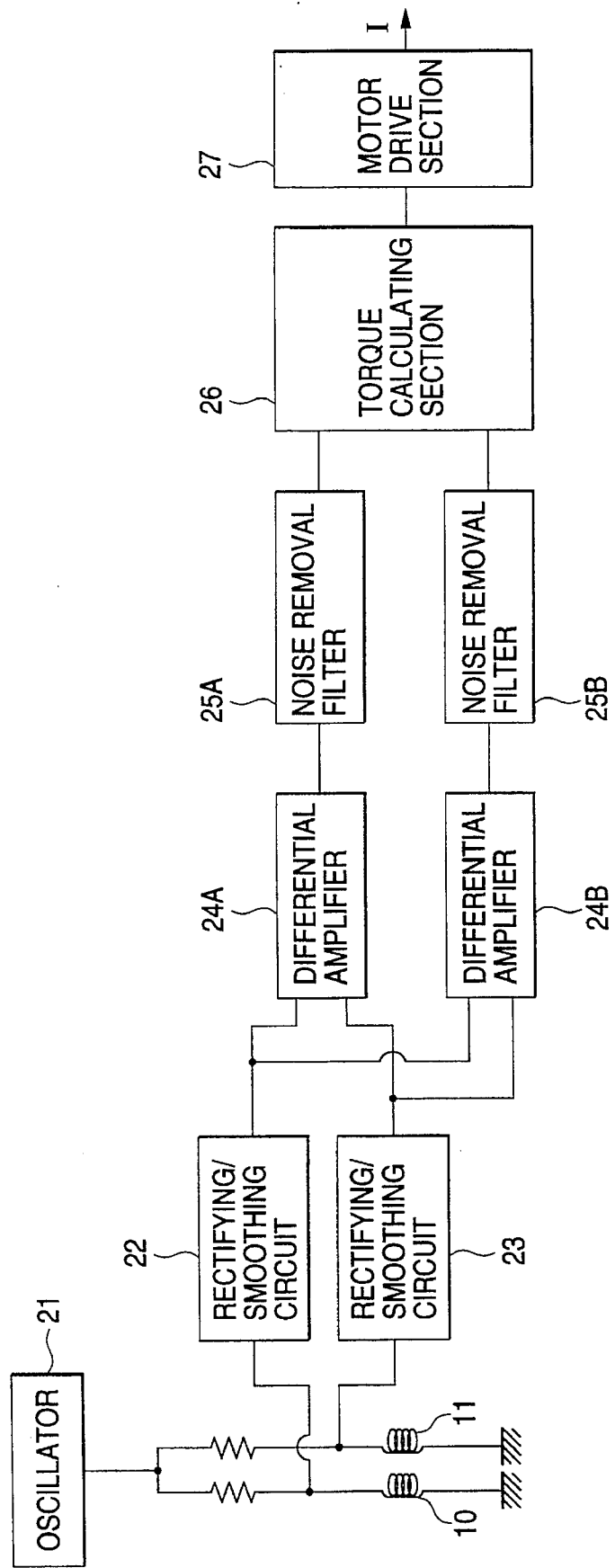
FIG. 5 is a circuit diagram showing an example of a control circuit for motor.
Figure 6:
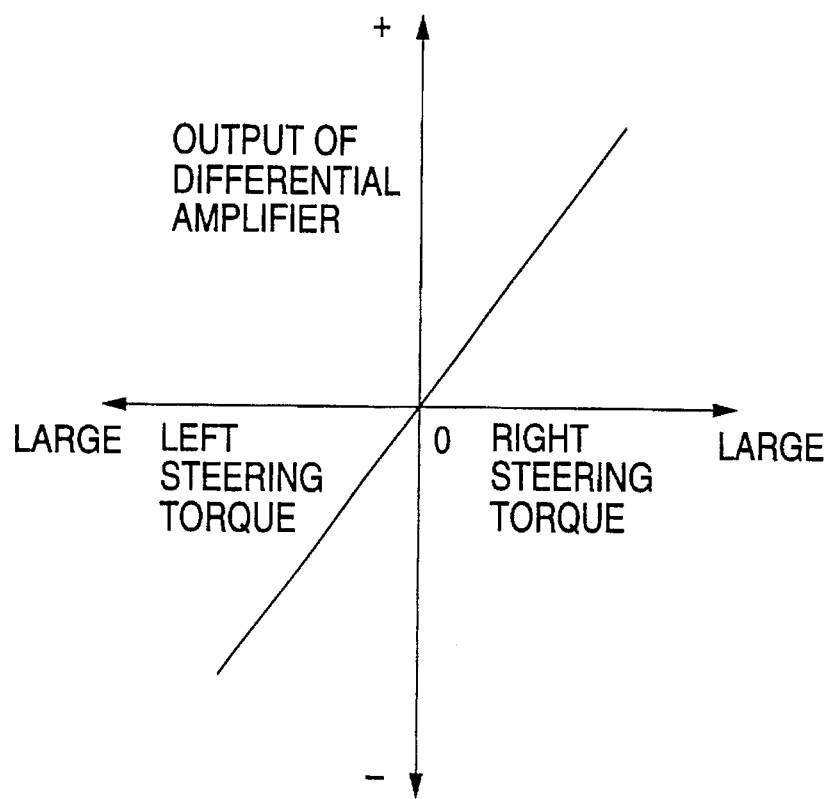
FIG. 6 is a graph showing the relationship between a steering torque and an output signal of a differential amplifier used in the motor control circuit.

The coils 10 and 11 are connected to a motor control circuit contained in a sensor case, not shown. The motor control circuit, as shown in FIG. 5, is made up of an oscillator 21, a rectifying/smoothing circuit 22, another rectifying/smoothing circuit 23, differential amplifiers 24A and 24B, noise removal filters 25A and 25B, a torque calculating means 26, and a motor drive means 27. The oscillator 21 supplies an AC current at a predetermined frequency to the coils 10 and 11. The rectifying/smoothing circuit 22 rectifies and smooths a self-induction electromotive force of the coil 10. The rectifying/smoothing circuit 23 rectifies and smooths a self-induction electromotive force of the coil 11. The differential amplifiers 24A and 24B each amplify the difference between the output signals of the rectifying/smoothing circuits 22 and 23. The noise removal filter 25A removes a high frequency noise component from the output signal of the differential amplifier 24A. The noise removal filter 25B removes a high frequency noise component from the output signal of the differential amplifier 24B. The torque calculating means 26 calculates the direction and the magnitude of a relative angular displacement of the input shaft 1 to the tubular member 4 on the basis of the average value, for example, of the output signals of the noise removal filters 25A and 25B, and multiplies the resultant by a predetermined coefficient, to thereby obtain a steering torque generated in the steering system. The motor drive means 27 feeds to the motor such a drive current I as to generate an auxiliary steering torque, which reduces a steering torque. The drive current I is determined by the result of the calculation by the torque calculating means 26.

The operation of the embodiment of the present invention will next be described.

Let us suppose that the steering system is in the state of straight-running, and the steering torque is 0. Then, no relative turn to the input shaft 1 to the output shaft 2 is caused. Accordingly, no relative turn of the input shaft 1 to the tubular member 4 is also caused.

When the steering wheel and hence the input shaft 1 are turned, a rotation force generated is transmitted to the output shaft 2 through the torsion bar 3. At this time, a resistance is caused in the output shaft 2. The resistance depends on a friction force caused between the steered wheels and the ground, and a friction force caused at the gears of the not-shown rack-and-pinion type steering system formed at the left end of the output shaft 2. By the resistance, the torsion bar 3 is twisted, so that the output shaft 2 is turned following the input shaft 1. This results in a relative turn of the input shaft 1 to the tubular member 4.

When a clockwise steering torque (steering torque generated when the wheel is turned clockwise), for example, is generated, the overlapping area of the window 4a and the groove 5a is decreased when comparing with that when the steering torque is 0, while the overlapping area of the window 4b and the window 5b is increased. When a counterclockwise steering torque (steering torque generated when the wheel is turned counterclockwise), is generated, the overlapping area of the window 4a and the groove 5a is increased when comparing with that when the steering torque is 0, while the overlapping area of the window 4b and the window 5b is decreased.

The overlapping portions of the windows 4a and the grooves 5a and those of the windows 4b and the windows 5b allow the bottom surfaces of the grooves 5a and 5b, not the surface of the large diameter portion 1A, to be exposed. In other words, a ratio of the portion of the surface of the large diameter portion 1A which is exposed through the windows 4a and 4b and the portion thereof surrounded by the tubular member 4 made of conductive and nonmagnetic material, varies in accordance with the steering torque. To be more specific, when the clockwise steering torque is generated, the exposure ratio of the large diameter portion 1A increases with increase of the steering torque on the inner side of the coil 10, while it decreases on the inner side of the coil 11. When the counterclockwise steering torque is generated, the exposure ratio of the surface of the large diameter portion 1A decreases with increase of the steering torque on the inner side of the coil 10, while it increases on the inner side of the coil 11.

The large diameter portion 1A has less resistance against the penetration of the magnetic flux than the tubular member 4. Therefore, when the clockwise steering torque is generated, the self-inductance of the coil 10 increases while the self-inductance of the coil 11 decreases. Hence, the self-induction electromotive force of the coil 10 is large, but the self-induction electromotive force of the coil 11 is small. When the counterclockwise steering torque is generated, the self inductance of the coil 10 decreases while the self-inductance of the coil 11 increases. Hence, the self-induction electromotive force of the coil 10 is small but the self-induction electromotive force of the coil 11 is large.

Accordingly, the output signal of each of the differential amplifiers 24A and 24B, which each receives the difference between the coils 10 and 11, linearly varies in accordance with the direction and the magnitude of the steering torque. The signal amplified in each of the differential amplifiers 24A and 24B, is the difference between the signals outputted from the rectifying/smoothing circuits 22 and 23. Therefore, the variations of the self-inductance caused by a temperature variation, for example, are cancelled.

The torque calculating means 26 calculates an average value of the output signals received through the noise removal filters 25A and 25B from the differential amplifiers 24A and 24B, multiplies the resultant by a predetermined proportional constant, and supplies the resultant to the motor drive means 27. The motor drive means 27 feeds to the motor a drive current I that is based on the direction and the magnitude of the steering torque.

Then, a rotation force which is based on the direction and the magnitude of the steering torque generated in the steering system, is generated in the motor. The rotation force is transmitted through the worm gear and the like to the output shaft 2. As a result, an auxiliary steering torque is additively applied to the output shaft 2, the steering torque is reduced, and a load to the driver is reduced.

When the tubular member 4 made of conductive and nonmagnetic material intersects with an alternating field, an eddy current is caused in the tubular member 4. This makes it hard for the magnetic flux to pass through the tubular member 4. As a result, the tubular member 4 has stronger resistance against penetration of the magnetic flux than air. On the other hand, the large diameter portion 1A of the input shaft 1 made of magnetic material has less resistance against penetration of the magnetic flux (than air). Therefore, the change of the exposure ratio of the surface of the large diameter portion 1A rapidly changes the self-inductance of the coils 10 and 11. Accordingly, the output signals of the differential amplifiers 24A and 24B also rapidly change, to thereby increase the sensor sensitivity. On the contrary, where there is no need of increasing the sensor sensitivity, the coils 10 and 11 may be reduced in size by decreasing the number of turns of the coils.

The magnetic flux passing through the tubular member 4 is concentrated in the skin or the surface region of the tubular member 4, which is close to the coils 10 and 11 because of the skin effect owing to the eddy current in the tubular member 4. Assuming that the frequency of the AC current fed to the coils 10 and 11 is f, permeability of the material of the tubular member 4 is μ, and electric conductivity of the material is σ, the thickness δ of the skin where the magnetic flux is concentrated is given by the following equation (1), $$\delta = 2/(2\pi f \cdot \sigma \cdot \mu)^{1/2} \tag{1}$$

A value of δ or thicker, which is calculated by the equation (1), suffices for the thickness of the tubular member 4. Therefore, the outside diameter of the sensor portion including the tubular member 4 may be reduced. If the tubular member 4 is thin, the outer size of the sensor may be remarkably reduced, and the distance from the coils 10 and 11 to the large diameter portion 1A may also be reduced. Consequently, the sensor sensitivity is further increased.

As seen from the foregoing description, the portion where the torque sensor is disposed is more reduced in size (thinned). When the torque sensor is applied to a motor vehicle limited in installing space, the present embodiment is particularly useful.

Further, the torque sensor of the invention does not require the mechanism for converting a relative rotary motion of the input shaft 1 to the output shaft 2 into a linear motion. Therefore, the construction of the torque sensor is simple, and the accuracy of the sensor is improved so much.

In the present embodiment, the input shaft 1 corresponds to a first rotary shaft; the output shaft 2, to a second rotary shaft; and the large diameter portion 1A, to a surrounded portion made of magnetic material. The oscillator 21, the rectifying/smoothing circuits 22 and 23, and the differential amplifiers 24A and 24B form electromotive force measuring means.

Figure 7:
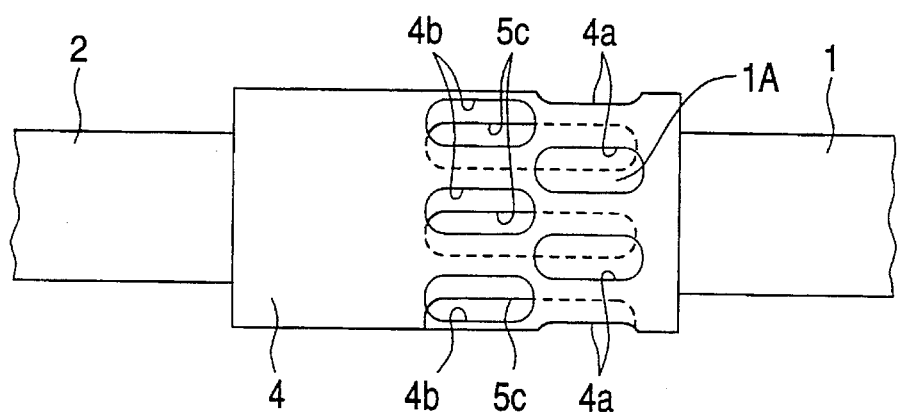
FIG. 7 is a front view of an assembly of the input and the output shafts, and the tubular member fastened thereto according to a second embodiment of the present invention.

FIG. 7 shows a second embodiment of the present invention. FIG. 7, like FIG. 4 in the first embodiment, is a front view of the assembly of the input shaft 1, the output shaft 2, and the tubular member 4 fastened thereto. In the figure, like or equivalent portions are designated by like reference numerals in the figures referred to in the description of the first embodiment.

Two groups of the grooves 5a, . . . , 5a, and 5b, . . . , 5b, axially separated, are used in the first embodiment. In the second embodiment, one group of grooves 5c, . . . , 5c is used in place of the two groups of the grooves. Accordingly, the cost to manufacture is reduced. Other useful effects of the first embodiment are also achieved by the second embodiment.

The above-mentioned embodiments each use two amplifier/filter systems; a couple of the differential amplifiers 24A and 24B and a couple of the noise removal filters 25A and 25B to improve reliability. One amplifier/filter system may be used if reliability of the respective circuits is satisfactory. If required, three amplifier/filter systems may be used.

In the above-mentioned embodiments, the torque sensor of the invention is applied to the motor driven power steering system for motor vehicles, but the application of the present invention is not limited to this.

The embodiments are each constructed so as to measure the self-induction electromotive forces of the coils 10 and 11. A mutual-induction electromotive force may be measured with provision of an oscillation coil. Further, the torque may be detected by using the self-induction electromotive force of one coil or the mutual-induction electromotive force, not using the difference between the signals from the two coils.

As described above, according to the first and second embodiments, windows are formed in a tubular member made of conductive and nonmagnetic material, which is turned together with a second rotary shaft. At least a surrounded portion of a first rotary shaft, which is surrounded by the tubular member, is made of magnetic material. Grooves, axially extended, are formed in the surrounded portion. A variation of the overlapping are of the window and the groove is measured in terms of an electromotive force of the coil. A torque generated in the first and the second rotary shafts is detected on the basis of the measurement result. Accordingly, there are obtained the effects that detection of torque with high accuracy can be carried out with the simple structure, and the device can be made compact.

A third embodiment of the present invention will next be described with reference to the accompanying drawings.

Figure 8:
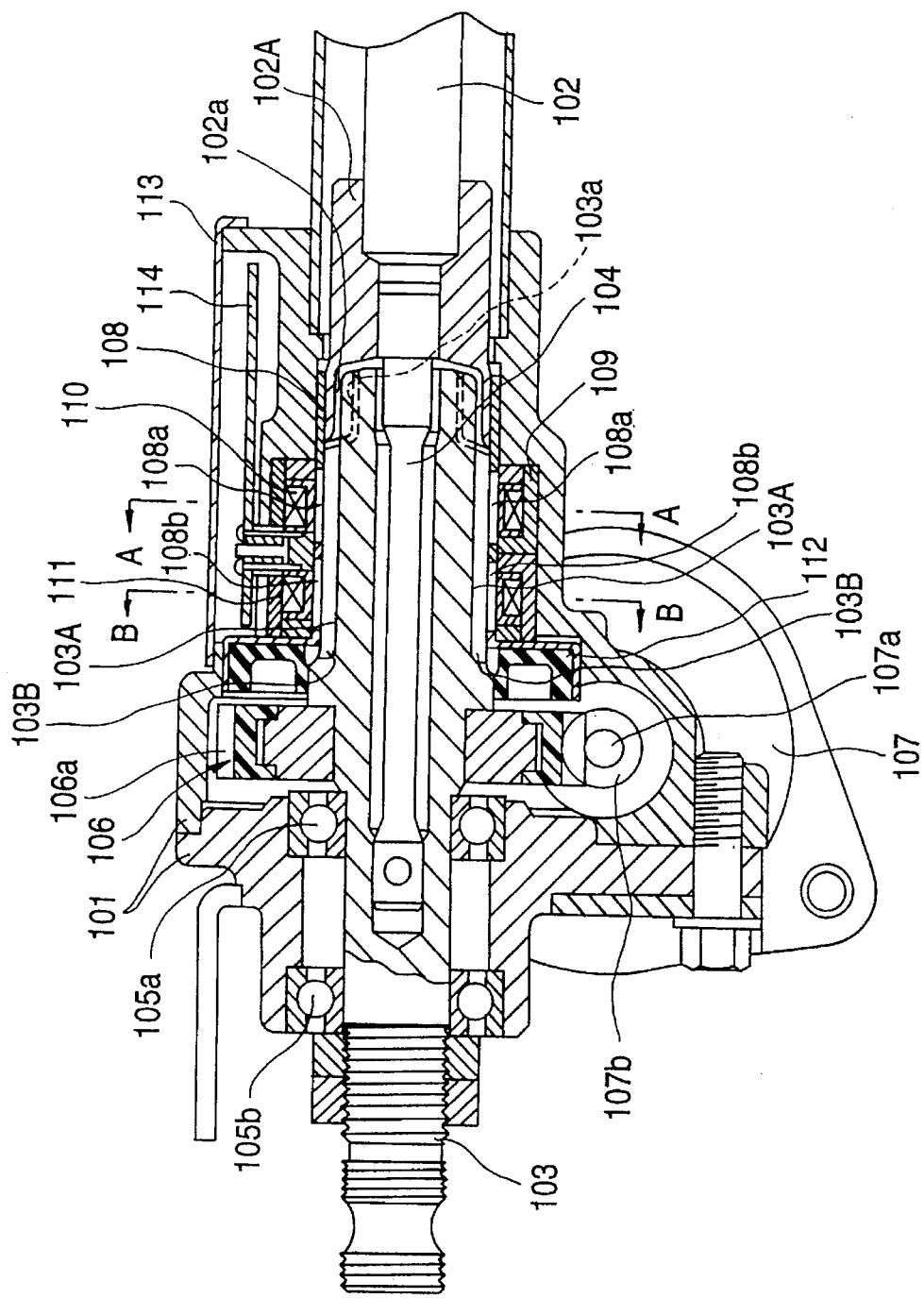
FIG. 8 is a longitudinal sectional view showing the construction of a third embodiment of the present invention.

FIG. 8 is a longitudinal sectional view showing an overall construction of the third embodiment of the present invention. In this embodiment, a torque sensor of the present invention is incorporated into a motor-driven power steering system for a motor vehicle.

The construction of the torque sensor will first be described. As shown in FIG. 8, an input shaft 102 and an output shaft 103, coupled with each other by a torsion bar 104, are rotatably supported by bearings 105a and 105b within a housing 101. The input and the output shafts 102 and 103, and the torsion bar 104 are coaxially disposed. The input shaft 102 and the torsion bar 104 are coupled with each other by means of a sleeve 102A with which the ends of those components are coupled in a spline fashion. The other end of the torsion bar 104 is spline coupled into the output shaft 103. The input shaft 102 and the output shaft 103 are made of magnetic material, e.g., iron.

A steering wheel (not shown) is firmly coupled with the right end (as viewed in FIG. 8) of the input shaft 102, while being arranged in the rotation direction of the shafts. For example, a pinion shaft which partially forms a known rack-and-pinion type steering system, is coupled with the left end (as viewed in FIG. 8) of the output shaft 103. With this construction, a steering force that is generated when a driver turns the steering wheel, is transmitted to the wheels to be steered (not shown), by way of a route of the input shaft 102, the torsion bar 104, the output shaft 103, and the rack-and-pinion type steering system.

The sleeve 102A, fastened to the end part of the input shaft 102, is long enough to cover the circumferential outer surface of the end of the sleeve 102A. A plural number of raised strips 102a, axially extended, are formed in the inner surface of a portion of the sleeve 102A, which covers the circumferential outer surface of the end part of the output shaft 103. A plural number of grooves 103a (equal in number to the raised strips 102a), axially extended, are formed in the circumferential outer surface of the output shaft 103, which faces the raised parts 102a. The raised parts 102a are respectively inserted into the grooves 103a with some freedom of movement in the circumferential direction. With this, a relative turn of the input shaft 102 to the output shaft 103 is limited within a predetermined angular range (e.g., approximately ±5°).

A worm wheel 106 is coaxially fit to the output shaft 103 so as to be rotatable together with the output shaft 103. An engaging part 106a (made of resin) of the worm wheel 106 engages with a worm 107b formed on the circumferential outer surface of the output shaft 107a of a motor 107, electrically driven. A rotation force of the motor 107 is transmitted to the output shaft 103 by way of a route of the output shaft 107a, the worm 107b, and the worm wheel 106. An auxiliary steering torque of a proper direction is applied to the output shaft 103 by properly changing the direction of a rotation of the motor 7.

A thin tubular member 108 is firmly fixed to the sleeve 102A, which is integrally coupled with the input shaft 102, in a state that it surrounds the circumferential outer surface of the output shaft 103 while being in close proximity to the outer surface thereof.

Figure 9:
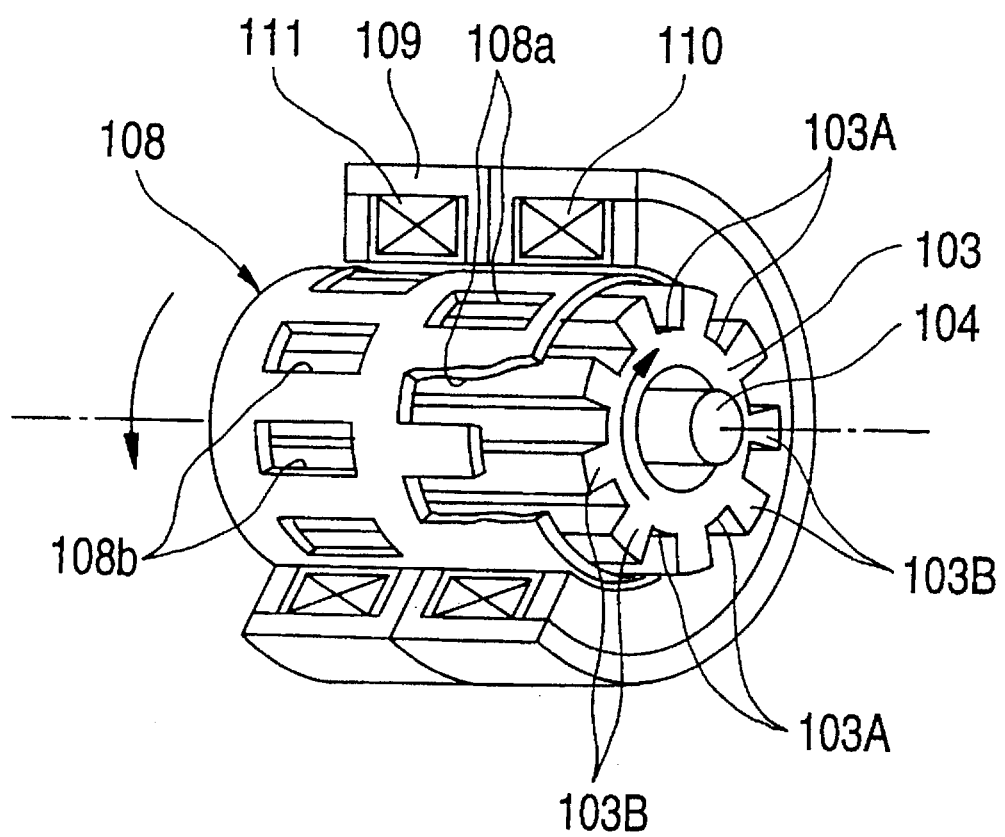
FIG. 9 is a perspective view showing a key portion of the embodiment of FIG. 8.

The tubular member 108 is made of conductive and nonmagnetic material (e.g., aluminum). As shown in FIG. 9 perspectively showing the tubular member 108 and its near portion, of the portion (referred to as a "surrounding portion") of the tubular member 108, which surrounds the output shaft 103, a part of the surrounding portion closer to the sleeve 102A includes a plural number (nine in the embodiment) of rectangular windows 108a, . . . , 108a, equidistantly arrayed in the circumferential direction. Another part of the surrounding portion located farther from the sleeve 102A includes a plural number (nine in the embodiment) of rectangular windows 108b, . . . , 108b (the same shape as that of the windows 108a), equidistantly arrayed in the circumferential direction, and shifted from the windows 108a and 108b by 180° of phase when viewed in the circumferential direction.

A plural number (equal in number to that of the windows 108a and 108b, and hence nine) of grooves 103A, approximately rectangular in cross section and axially extended, are formed in the circumferential outer surface of the portion of the output shaft 103, which is surrounded by the tubular member 108.

Figure 10:
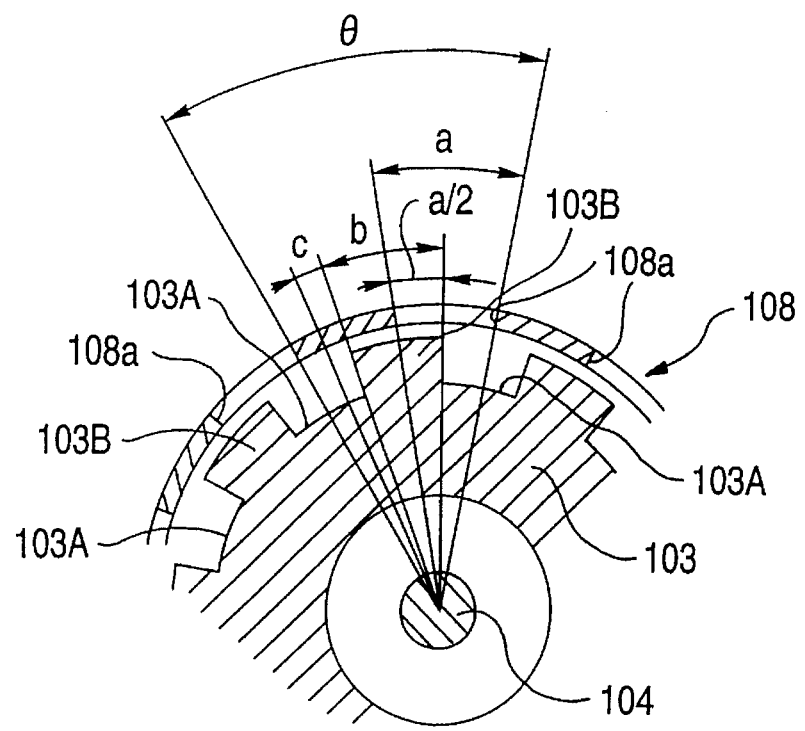
FIG. 10 is a cross sectional view showing a tubular member and an output shaft, taken on line A—A in FIG. 8.
Figure 11:
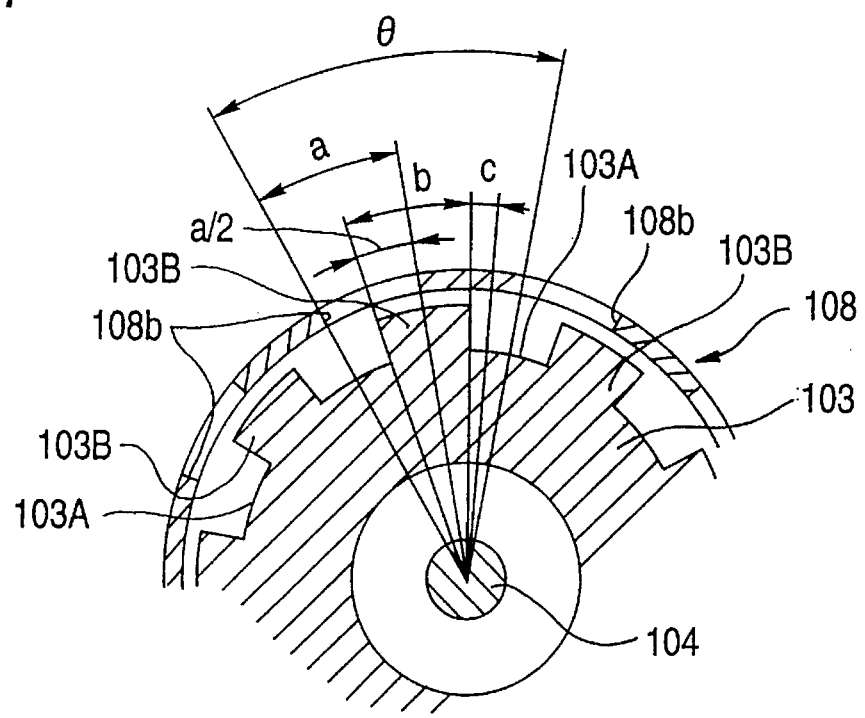
FIG. 11 is a cross sectional view showing the tubular member and the output shaft, taken on line B—B in FIG. 8.

The details of this structure will be descried with reference to FIG. 10 showing a cross section of the tubular member 108 and the output shaft 103, taken on line A—A in FIG. 8, and FIG. 11 showing a cross section of them taken on line B—B in FIG. 8. As shown, the outer surface of the tubular member 108 is divided into an N (N=9 in the embodiment) number of segments. An angle, which is between lines radially prolonged from the center of the tubular member 108 when viewed in cross section to both ends of each segment when viewed also in cross section, is defined as one period angle θ (=360/N, θ=40° in the embodiment). A range within which a relative turn of the tubular member 108 to the output shaft 103 (the input shaft 102 to the output shaft 103) is allowed is defined by an angle c°.

The tubular member 108 is surrounded by yokes 109A and 109B, which are respectively wound by coils 110 and 111 having equal technical specifications. These coils 110 and 111 are disposed coaxially with the tubular member 108. The coil 110 is put on the yoke 109A so as to surround the portion of the tubular member having the windows 108a, . . ., 108a formed therein. Similarly, the coil 111 is put on the yoke 109B so as to surround the portion of the tubular member having the windows 108b, . . . , 108b formed therein. The yokes 109A and 109B are secured to the housing 101. Within the housing 101, a space where the worm wheel 106 is disposed is isolated from a space where the yokes 109A and 109B are disposed, by an oil seal 112. Provision of the oil seal 112 prevents lubricant, which is fed to the meshing part of the worm wheel 106 and the motor 107, from going to the yokes 109A and 109B.

The present embodiment is arranged so as to satisfy the following expression (3)

$$A < Lw < B \quad (3)$$

where

A: axial length of the coil 111

B: axial length of the yoke 109B

Figure 12:
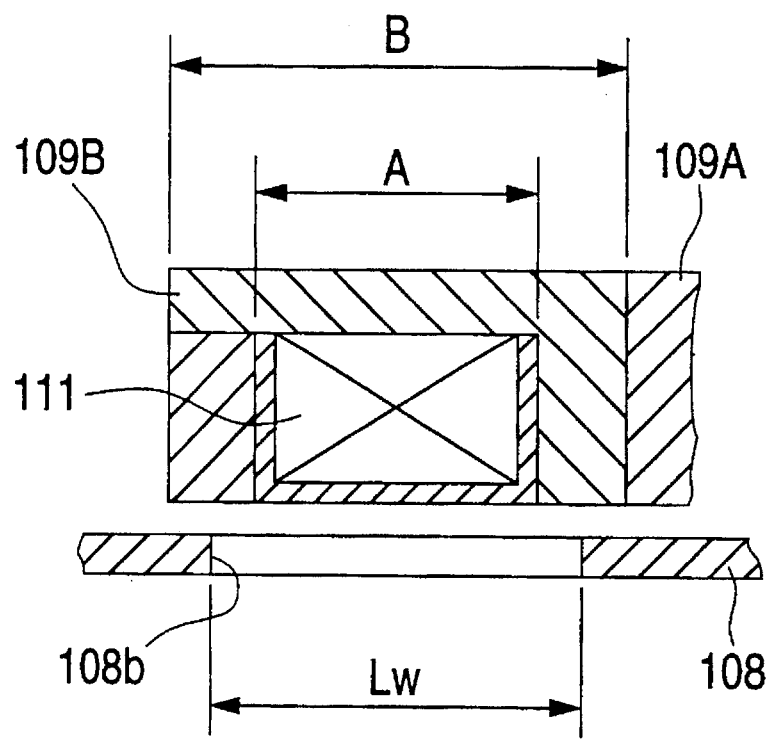
FIG. 12 is a cross sectional view showing a key portion of the third embodiment, useful in showing dimensions thereof.

Lw: axial length of the window 108b (see FIG. 12).

Although not specifically illustrated, the coil 110 has the same configuration as of the coil 111; the yoke 109A has the same configuration as of the yoke 109B; and the window 108a has the same shape as of the window 108b. Therefore, the expression (3) also holds among the axial length A of the coil 110, the axial length B of the yoke 109A, and the axial length Lw of the window 108a.

Figure 13:
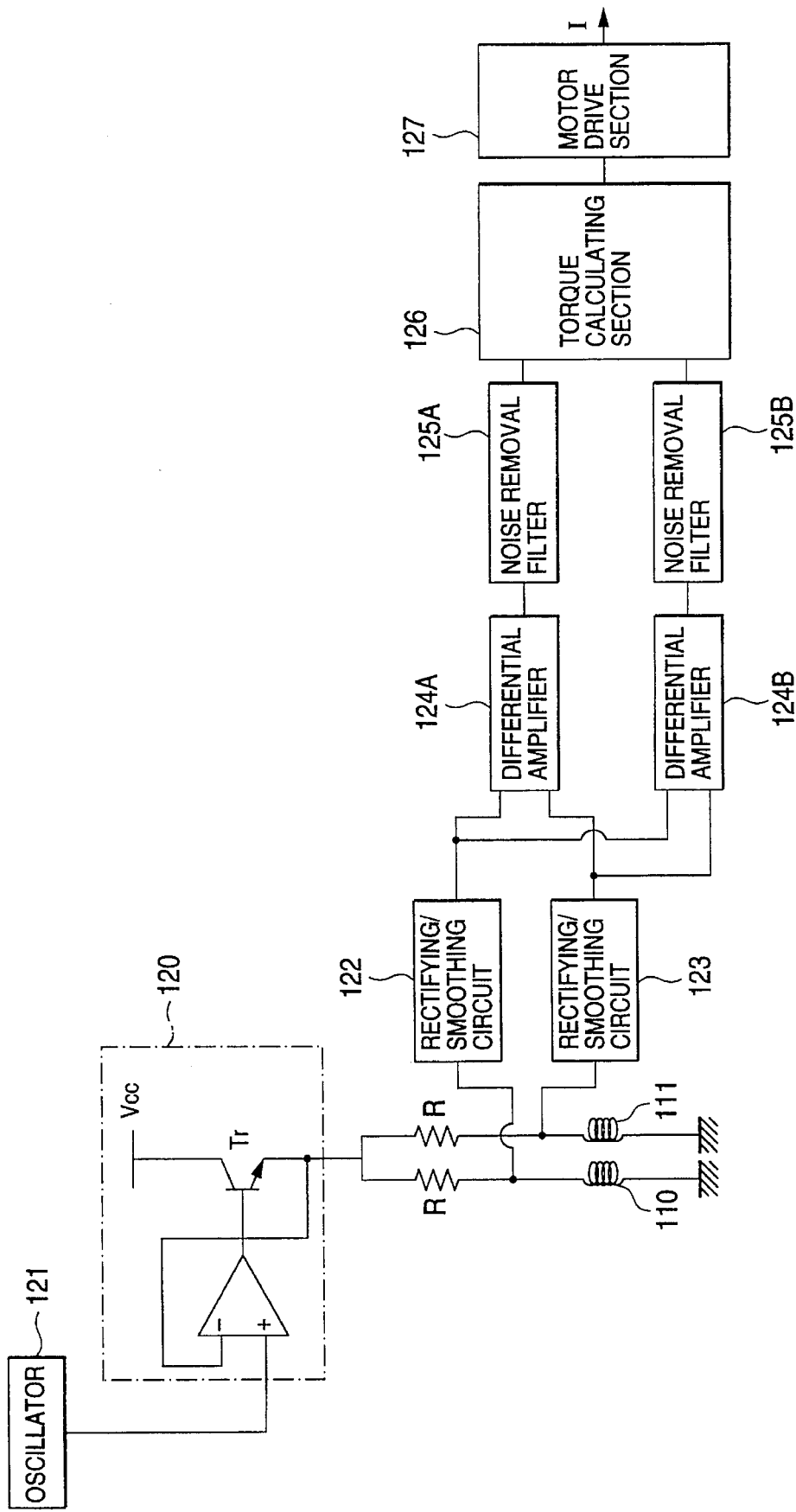
FIG. 13 is a circuit diagram showing an example of a control circuit for controlling a motor.

The coils 110 and 111 are connected to a motor control circuit mounted on a control board 114 in a sensor case 113. The motor control circuit, as shown in FIG. 13, is made up of an oscillator 121, a rectifying/smoothing circuit 122, another rectifying/smoothing circuit 123, differential amplifiers 124A and 124B, noise removal filters 125A and 125B, a torque calculating means 126, and a motor drive means 127. The oscillator 121 supplies an AC current at a predetermined frequency through a constant current circuit 120 to the coils 110 and 111. The rectifying/smoothing circuit 122 rectifies and smooths a self-induction electromotive force of the coil 110. The rectifying/smoothing circuit 123 rectifies and smooths a self-induction electromotive force of the coil 111. The differential amplifiers 124A and 124B each amplify the difference between the output signals of the rectifying/smoothing circuits 122 and 123. The noise removal filter 125A removes a high frequency noise component from the output signal of the differential amplifier 124A. The noise removal filter 125B removes a high frequency noise component from the output signal of the differential amplifier 124B. The torque calculating means 126 calculates the direction and the magnitude of a relative angular displacement of the input shaft 102 to the tubular member 108 on the basis of the average value, for example, of the output signals of the noise removal filters 125A and 125B, and multiplies the resultant by a predetermined coefficient, to thereby obtain a steering torque generated in the steering system. The motor drive means 127 feeds to the motor such a drive current I as to generate an auxiliary steering torque, which reduces a steering torque. The drive current I is determined by the result of the calculation by the torque calculating means 126.

The operation of the embodiment of the present invention will next be described.

Let us suppose that the steering system is in the state of straight-running, and the steering torque is 0. Then, no relative turn to the input shaft 102 to the output shaft 103 is caused. Accordingly, no relative turn of the input shaft 102 to the tubular member 108 is also caused.

When the steering wheel and hence the input shaft 102 are turned, a rotation force generated is transmitted to the output shaft 103 through the torsion bar 104. At this time, a resistance is caused in the output shaft 103. The resistance depends on a friction force caused between the steered wheels and the ground, and a friction force in the meshing part where the output shaft 103 is coupled with the rack-and-pinion type steering system. By the resistance, the torsion bar 104 is twisted, so that the output shaft 103 is turned following the input shaft 102. This results in a relative turn of the input shaft 102 to the tubular member 108.

When a clockwise steering torque (steering torque generated when the wheel is turned clockwise), for example, is generated, the tubular member 108 is turned counterclockwise in FIGS. 10 and 11, so that the overlapping area of the window 108a and the raised part 103B is increased when comparing with that when the steering torque is 0, while the overlapping area of the window 108b and the raised part 103B is decreased. When a counterclockwise steering torque (steering torque generated when the wheel is turned counterclockwise), is generated, the tubular member 108 is turned clockwise in FIGS. 10 and 11, so that the overlapping area of the window 108a and the raised part 103B is decreased when comparing with that when the steering torque is 0, while the overlapping area of the window 108b and the raised part 103B is increased.

Figure 14:
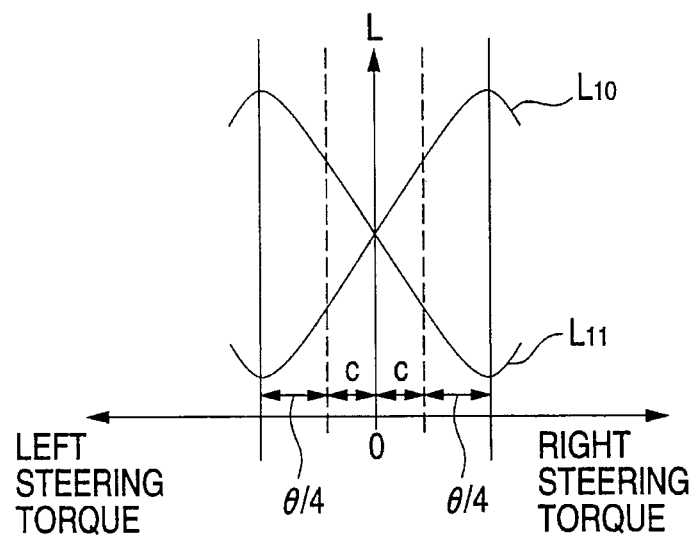
FIG. 14 is a graph showing relationships between steering torques and the inductance of coils.

As described before, as shown in FIG. 14, as the clockwise torque increases, the inductance $L_{10}$ of the coil 110 increases, while the inductance $L_{11}$ of the coil 111 decreases. As the counter clockwise torque increases, the inductance $L_{10}$ of the coil 110 decreases, but the inductance $L_{11}$ of the coil 111 increases. The relationship between a relative turn of the tubular member 108 to the output shaft 103 and the steering torque is also shown in FIG. 14.

Where the inductance values $L_{10}$ and $L_{11}$ are varied as shown in FIG. 14, the impedance values of the coils 110 and 111 are also varied in a similar fashion, if the frequency ω of the current fed to the coils 110 and 111 is fixed. The self-inductance electromotive forces of the coils 110 and 111 also vary in a similar fashion. Accordingly, the output signals of the differential amplifiers 124A and 124B each for amplifying the difference between the self-induction electromotive forces of the coils 110 and 111 are linearly varied in accordance with the direction and the magnitude of the steering torque. The self-inductance variations, caused by temperature, for example, are cancelled since the difference between the output signals of rectifying/smoothing circuits 122 and 123 is processed by each of the differential amplifiers 124A and 124B.

The torque calculating means 126 calculates an average value of the output signals received through the noise removal filters 125A and 125B from the differential amplifiers 124A and 124B, multiplies the resultant by a predetermined proportional constant, and supplies the resultant to the motor drive means 127. The motor drive means 127 feeds to the motor a drive current I that is based on the direction and the magnitude of the steering torque.

Then, a rotation force, which depends on the direction and the magnitude of the steering torque generated in the steering system, is generated in the motor 107. The rotation force is transmitted through the worm gear and the like to the output shaft 103. As a result, an auxiliary steering torque is additively applied to the output shaft 103, so that the steering torque is reduced, and a load to a driver is reduced.

As described above, in the present embodiment, the axial length A of the coils 110 and 111, the axial length B of the yokes 109A and 109B, and the axial length Lw of the windows 108a and 108b are selected so as to satisfy the expression (3). Therefore, even in such a case where the centers of the coils 110 and 111 and the yokes 109A and 109B when viewed in the axial direction thereof is axially shifted from those of the windows 108a and 108b by axial errors in assembling the tubular member 108 into the housing 101, an axial shift of the windows 108a and 108b of the tubular member 108, and the like, a considerable reduction of the impedance of the coils 110 and 111 will never occur.

Figure 15:
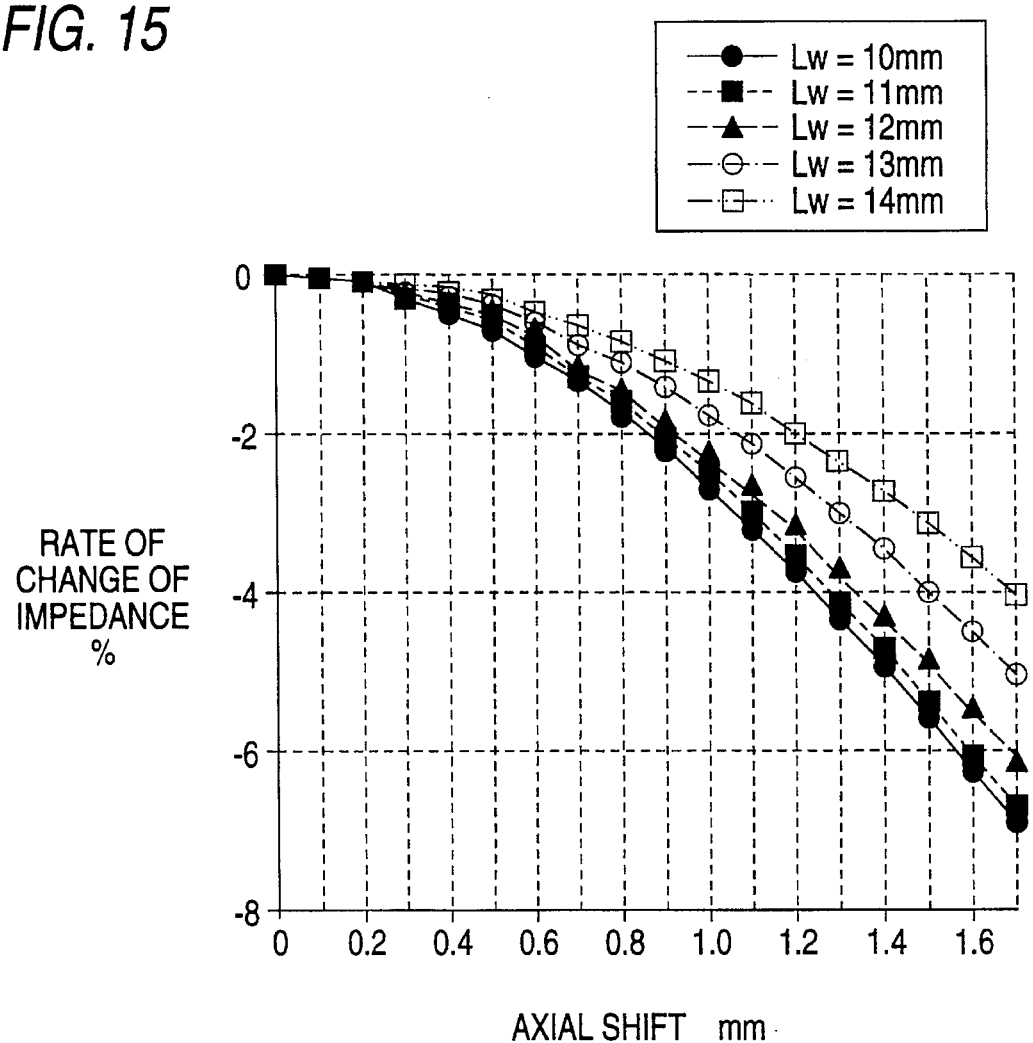
FIG. 15 is a graph in which the abscissa represents the axial shift of the centers of the coils and the yokes from those of the windows, and the ordinate represents a rate of change of the impedance.

FIG. 15 shows a graph in which the abscissa represents the axial shift of the centers of the coils 110 and 111 and the yokes 109A and 109B from those of the windows 108a and 108b, and the ordinate represents a rate of change of the impedance. In a measurement of which the results are plotted in the graph, the axial length A of the coils 110 and 111 was 8 mm, and the axial length Lw of the windows 108a and 108b was varied from 10 mm to 14 mm in the steps of 1 mm. As seen, a change of the impedance of each of the coils 110 and 111, which is caused by the axial shift, is smaller, the longer the axial length Lw is.

Satisfaction of the following expression suffices for the axial length B of the yokes 109A and 109B.

$$B > A + 2\delta$$

where $\delta$: depth of flux penetration. However, it is necessary to eliminate the mutual effects of the coils 110 and 111, and the effects from the outside of the yokes 109A and 109B in the axial direction by taking the measure that the windows 108a and 108b are not moved out of the range of the yokes 109A and 109B owing to the axial errors in assembling the component parts. To this end, it is preferable to select the axial length B of the yokes 109A and 109B and the axial length Lw of the windows 108a and 108b so as to satisfy the following relation:

$$B > Lw.$$

As described above, in the present embodiment, the axial lengths A, B and Lw are selected so as to satisfy the expression (3).

Where the change of the impedance of the coils 110 and 111 is reduced, the degradation of the detection accuracy is lessened so much. In other words, in a case where further improvement of the detecting accuracy is not required, relatively low accuracies of the assembling and the component parts are allowed. This leads to reduction of the cost to manufacture.

In the present embodiment, the input shaft 102 corresponds to a second rotary shaft; the output shaft 103, to a first rotary shaft; and the portion of the output shaft 103 surrounded by the tubular member 108, to a surrounded portion.

As seen from the foregoing description, in this embodiment of the present invention, windows are formed in a tubular member made of conductive and nonmagnetic material, which is rotatable together with a second rotary shaft, a surrounded portion of the first rotary shaft, which is surrounded by the tubular member, is made of magnetic material, grooves, axially extended, are formed in the surrounded portion of the first rotary shaft, a torque is detected using changes of the impedance values of coils, which results from a change of the overlapping areas of the windows and the grooves, and the axial length of each window is longer than the axial length of the coils but shorter than the axial length of the yokes for holding the coils thereon. With such a construction, the torque sensor of this embodiment is simple in structure, and further has such an advantageous effect that the axial accuracies of the component parts and the axial errors in assembling the parts affect little influence to the torque sensing accuracy.

A fourth embodiment of the present invention will next be described.

An overall construction of the fourth embodiment is the same as that of the third embodiment so that the same or like components are designated by the same reference numerals and the description thereof will be omitted.

Figure 16:
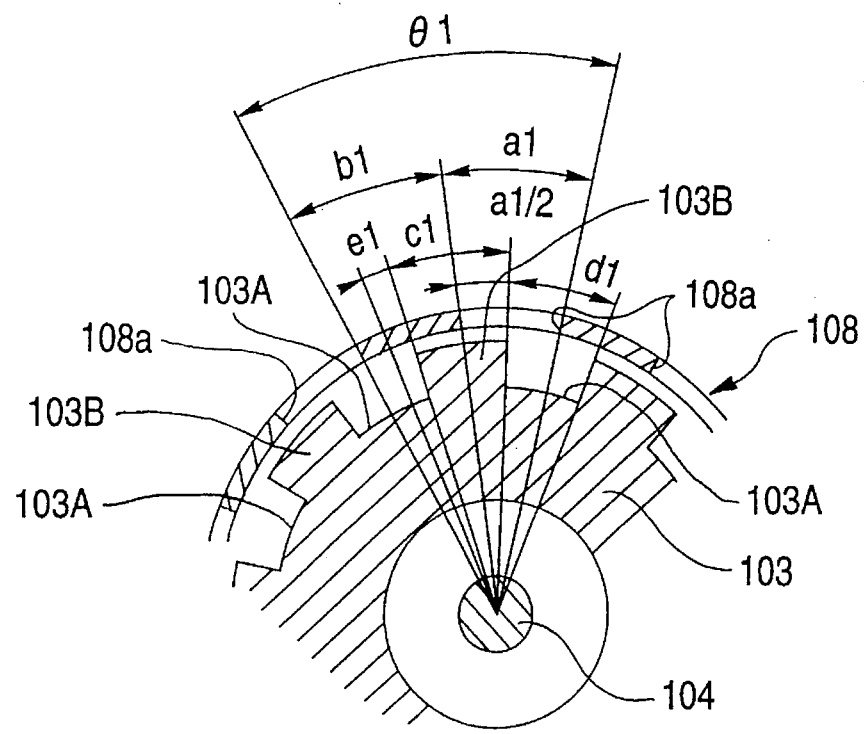
FIG. 16 is a cross sectional view showing a tubular member and an output shaft in a fourth embodiment.
Figure 17:
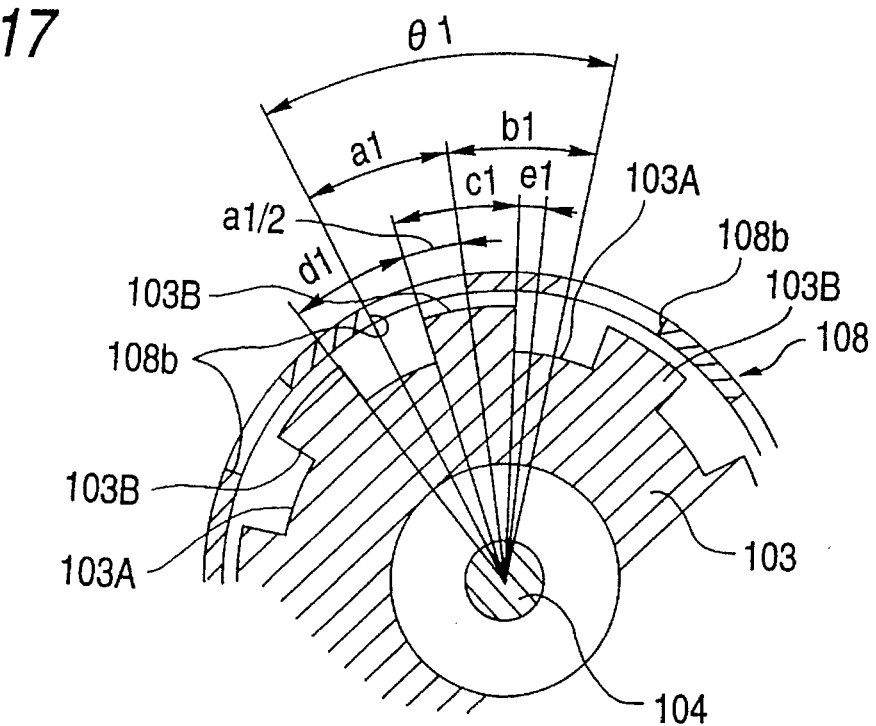
FIG. 17 is also a cross sectional view showing the tubular member and the output shaft in the fourth embodiment.

As shown in FIGS. 16 and 17 each showing a cross section of the tubular member 108 and the output shaft 103, the outer surface of the tubular member 108 is divided into an N (N=9 in the embodiment) number of segments. An angle, which is between lines radially prolonged from the center of the tubular member 108 when viewed in cross section to both ends of each segment when viewed also in cross section, is defined as one period angle $\theta 1$ (=360/N, $\theta 1$=40° in the embodiment). In the part of the surrounding portion of the tubular member 108, which is closer to the sleeve 102A, each of the windows 108a, . . . , 108a ranges from one end of the segment to a point angularly distanced from the end thereof by an angle a1. The remaining part of the segment, which is defined by an angle b1 (=$\theta 1$−a1), remains not cut out. In the part of the surrounding portion located farther from the sleeve 102A, each of the windows 108b, . . . , 108b ranges from the other end of the segment to a point angularly distanced from the end thereof by the angle a1, while being shifted from the window 108a by the half period ($\theta 1$/2). The remaining part of the segment, which is defined by an angle b1 (=$\theta 1$−a1), remains not cut out. The circumferential width (when viewed in the circumferential direction) of each raised part 103B between the adjacent grooves of those 103A, . . . 103A is defined by an angle c1°, the width of each of the grooves 103A, . . . , 103A is defined by angle d1°, and a range within which a relative turn of the tubular member 108 to the output shaft 103 (the input shaft 102 to the output shaft 103) is allowed is defined by an angle e1°.

When the torsion bar 4 is not twisted (the steering torque is zero), for example, c1=20°, the center of a window 108a when viewed in the circumferential direction is radially aligned with the left end of the groove 103A currently located in association with the window 108a (the right edge of the raised part 103B located on the left side thereof) (see FIG. 16). The center of a window 108b is radially aligned with the right end of the groove 103A currently located in association with the window 108b (the left edge of the raised part 103B located on the right side thereof) (see FIG. 17). Accordingly, the overlapping area of the window 108a and the groove 103A is opposite to that of the window 108b and the groove 103A when viewed in the circumferential direction. The center of each of the windows 108a and 108b when viewed in the circumferential direction is shifted from that of the corresponding groove 103A by θ1/4.

In this embodiment, the relation among those angles is expressed by $$b1 > a1 \quad (11)$$

$$d1 > c1 \quad (12)$$

$$c1 < \theta 1/4 \quad (13)$$

The conditions of the inequalities (11) and (12) are required for securing a rapid change of the impedance of coils to be described later. The condition of the inequality (13) is for monotonously increasing or decreasing the impedance of the coils.

Although the operation of the fourth embodiment of the present invention is almost the same as that of the third embodiment, the operation thereof will be described.

Let us suppose that the steering system is in the state of straight-running, and the steering torque is 0. Then, no relative turn to the input shaft 102 to the output shaft 103 is caused. Accordingly, no relative turn of the input shaft 102 to the tubular member 108 is also caused.

When the steering wheel and hence the input shaft 102 are turned, a rotation force generated is transmitted to the output shaft 103 through the torsion bar 104. At this time, a resistance is caused in the output shaft 103. The resistance depends on a friction force caused between the steered wheels and the ground, and a friction force in the meshing part where the output shaft 103 is coupled with the rack-and-pinion type steering system. By the resistance, the torsion bar 104 is twisted, so that the output shaft 103 is turned following the input shaft 102. This results in a relative turn of the input shaft 102 to the tubular member 108.

In a case where the tubular member 108 does not have windows formed therein, when an AC current is fed to the coils, to thereby cause an alternating field therein, an eddy current is generated in the outer surface of the tubular member 108, since the tubular member 108 is made of conductive and nonmagnetic material. The direction of the eddy current generated is opposite to that of the current fed to the coil.

When the magnetic fields developed by the eddy current are superposedly placed in the magnetic fields by the coils, these magnetic fields are cancelled by each other within the tubular member 108.

In a case where the tubular member 108 has windows 108a and 108b formed therein, the windows 108a and 108b prevent the eddy current, which is generated in the outer surface of the tubular member 108, from circulating through the circumferential outer surface. Therefore, the eddy current flows along one of the end faces of each window 108a and 108b to the inner side of the tubular member 108. In the inner side of the tubular member 108, the eddy current flows in the same direction as the coil current. The eddy current emanates from the inner side of the tubular member 8, passes through the other end face of the window, and returns to the outer side or surface thereof. Thus, the eddy current path is looped.

In other words, a plural number of eddy current loops are circumferentially arranged periodically (θ1=360/N) within each coil.

The magnetic fields developed by the coil currents are superposedly placed in the eddy current. The resultant magnetic field is distributed such that the intensity thereof periodically varies in the circumferential direction, viz., along, and above and below the shell of the tubular member 108 when viewed in cross section, and gradually decreases toward the center of the tubular member 108. The magnetic field, which is circumferentially distributed, is most intensive at the center of each of the windows 108a and 108b where the magnetic field is largely influenced by the adjacent eddy currents, and is weak at a position shifted from center of the window by the half period (θ1/2).

Within the tubular member 108, the shaft 103 made of magnetic material is disposed coaxially with the tubular member 8. The grooves 103A and the raised parts 103B, arrayed at the same periods as the windows 108a and 108b, are formed in the outer surface of the output shaft 103.

When a magnetic material is placed in a magnetic field, it is magnetized and the magnetized magnetic material spontaneously develops a magnetic flux. The quantity of the magnetic flux increases proportionally to an intensity of the magnetic field till the magnetic material is magnetically saturated.

The spontaneous magnetization of the output shaft 103 varies with a relative phase of the output shaft 103 to the tubular member 108 under the influence by the magnetic field periodically varying in the circumferential direction and the magnetic field varying in the radial direction.

A phase of the output shaft to maximize the spontaneous magnetization is set at a point where the center of each of the windows 108a and 108b is coincident with the center of each of the raised parts 103B.

The coil inductance varies with a variation of the spontaneous magnetization. A profile of the variation of the coil inductance is substantially sinusoidal.

A phase of the output shaft when no torque acts on the shaft per se is shifted ¼ period (θ1/4) from the phase to maximize the spontaneous magnetization (inductance). The phase difference between the window series located closer to the sleeve 102A and the window series farther from the sleeve 102A is ½ period (θ1/2), as already mentioned.

With the mechanical and electrical construction, when a torque acts on the shaft and a phase difference is created between the output shaft 103 and the tubular member 108, one of the coils 110 and 111 increases in its inductance, while the other decreases at the same varying rate.

Figure 18:
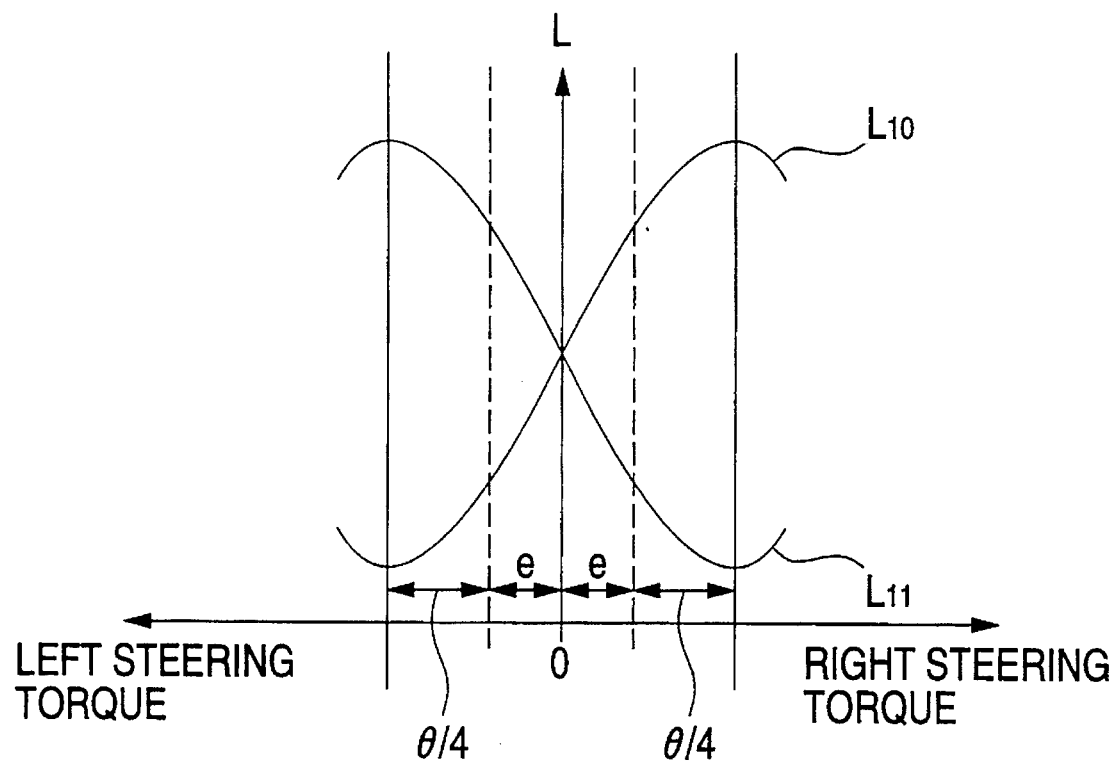
FIG. 18 is a graph showing relationship between steering torques and the inductance of coils.

When a clockwise steering torque is generated, the tubular member 108 is turned counterclockwise in FIGS. 16 and 17. At this time, the inductance $L_{10}$ of the coil 110 increases from the inductance value when the steering torque is zero, while the inductance $L_{11}$ of the coil 111 decreases, as shown in FIG. 18. With increase of a counterclockwise steering torque, the inductance $L_{10}$ of the coil 110 decreases, while the inductance $L_{11}$ of the coil 111 increases. The relationship between a relative rotation angle of the tubular member 108 to the output shaft 103 and the steering torque is also shown in FIG. 18. As seen from the graph of the figure, in a range where a relative angle is varied by an angle (θ1/4) from the position where the steering torque is 0 in the direction of increasing the clockwise steering torque or the counterclockwise steering torque, the inductance values $L_{10}$ and $L_{11}$ monotonously vary. When the steering torque increases in excess of the range, the inductance values $L_{10}$ and $L_{11}$ vary in the reverse direction. It is for this reason that the range of the relative turn is limited within ±e1°.

Where the inductance values $L_{10}$ and $L_{11}$ are varied as shown in FIG. 18, the impedance values of the coils 110 and 111 are also varied in a similar fashion, if the frequency ω of the current fed to the coils 110 and 111 is fixed. The self-induction electromotive forces of the coils 110 and 111 also vary in a similar fashion. Accordingly, the output signals of the differential amplifiers 124A and 124B each for amplifying the difference between the self-inductance electromotive forces of the coils 110 and 111 are varied in accordance with the direction and the magnitude of the steering torque. The self-inductance variations, caused by temperature, for example, are cancelled since the difference between the output signals of rectifying/smoothing circuits 122 and 123 is processed by each of the differential amplifiers 124A and 124B.

The torque calculating means 126 calculates an average value of the output signals received through the noise removal filters 125A and 125B from the differential amplifiers 125A and 125B, multiplies the resultant by a predetermined proportional constant, and supplies the resultant to the motor drive means 127. The motor drive means 127 feeds to the motor a drive current I that is based on the direction and the magnitude of the steering torque.

Then, a rotation force, which depends on the direction and the magnitude of the steering torque generated in the steering system, is generated in the motor 107. The rotation force is transmitted through the worm gear and the like to the output shaft 103. As a result, an auxiliary steering torque is additively applied to the output shaft 103, so that the steering torque is reduced, and a load to the driver is reduced.

Assuming that in the angular relationships as shown in FIGS. 16 and 17, the circumferential widths of all the windows 108a, 108a, 108b, and 108b, the grooves 103A and the raised parts 103B are equal to each other, the following equation holds:

$$a1=b1=c1=d1=\theta 1/2.$$

Since N=9, $$\theta 1/2=20°.$$

The impedance was measured by properly varying the angles a1 to d1 on the reference of $$a=b=c=d=20°.$$

Figure 19:
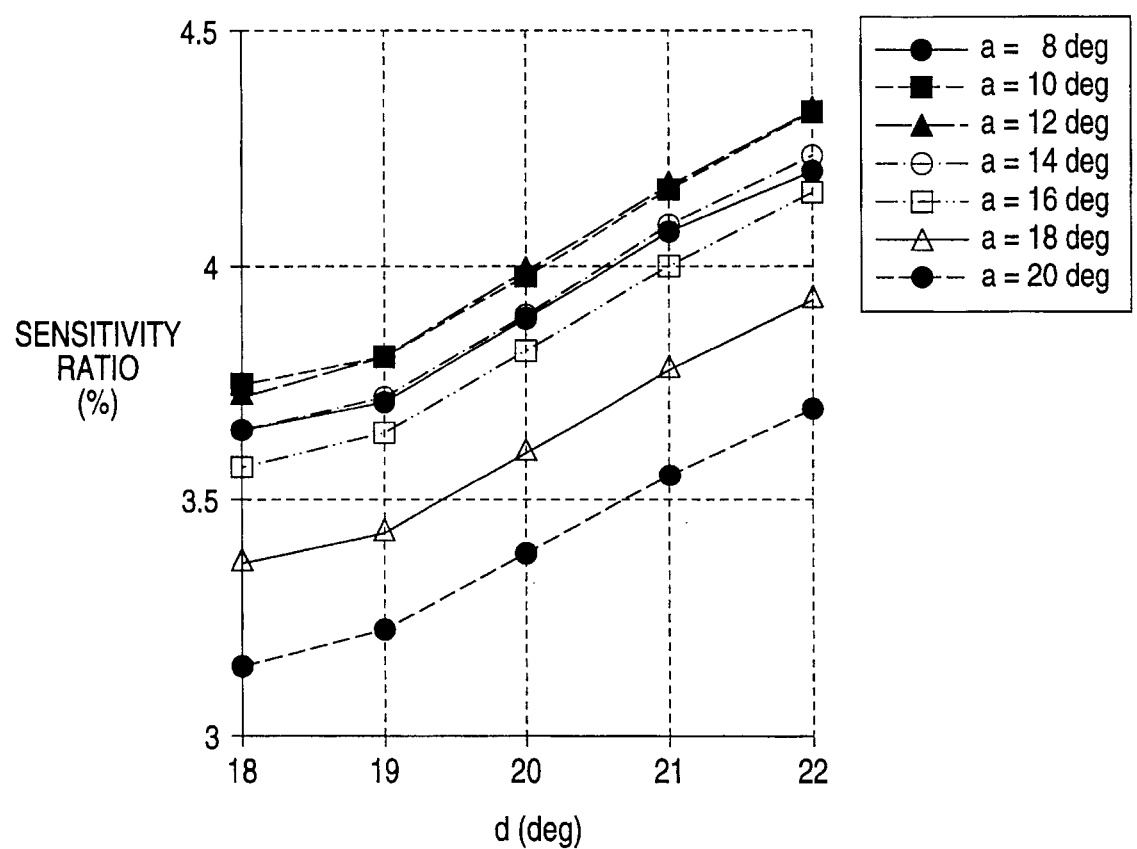
FIG. 19 is a graph showing relationship between the dimensions of the respective portions and a sensitivity ratio.

The results of the measurement are as shown in FIG. 19. In FIG. 19, the abscissa represents the angle d1, and the ordinate represents a sensitivity ratio (impedance change rate) of the torque sensor. In the measurement, the angle a1 was varied within the range between 20° and 8°. In FIG. 19, the polygonal lines represent the results of the measurement at the respective angles a1.

As seen from the graph showing the measurement results, if the angle d1, which defines the circumferential width of each of the grooves 103A, is set to be larger than 20° (viz., the angle d1 is set to be larger than the angle c1 that defines the circumferential width of each of the raised parts 103B), the sensitivity ratio is increased. The graph also teaches that if the angle a1 that defines the circumferential width of each of the windows 108a and 108b is set to be smaller than 20° (viz., the angle a1 is set to be smaller than the angle b1), the sensitivity ratio is increased.

The present embodiment can increase the impedance change ratio and hence the sensor sensitivity while leaving unchanged the material quality and the dimensions of other parts unchanged since the embodiment is arranged so as to satisfy the inequalities (11) and (12).

The sensitivity of the torque sensor can be increased while leaving unchanged the number of turns of the coils, for example. This fact implies that where no further increase of the sensitivity is required, the sensor size may be reduced by decreasing the number of turns of the coils 110 and 111, and the requirements for the temperature characteristics of electronic parts used may be relaxed or the electronic circuit used may be made insensitive to disturbance by decreasing the gain of the amplifier. The fact that the size reduction of the sensor is possible is very useful particularly when it is applied to the vehicle having a limited space, as in the present embodiment.

Figure 20:
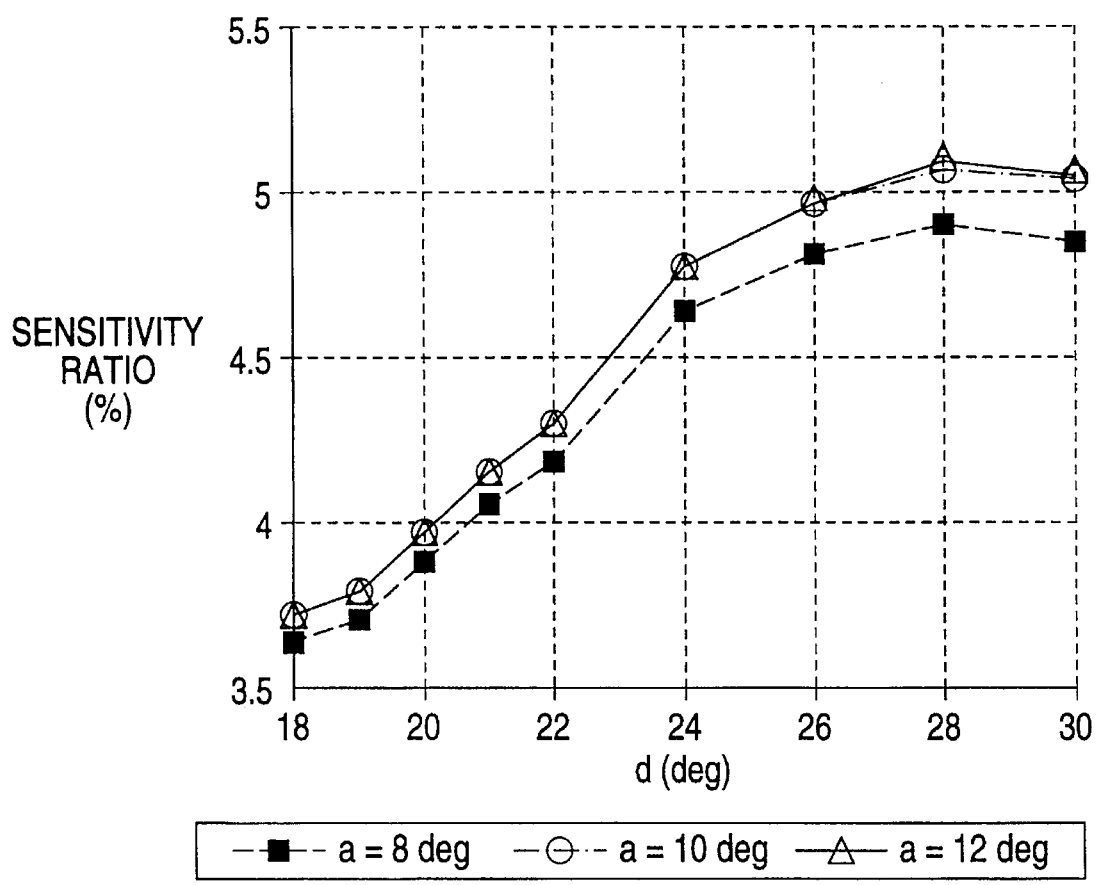
FIG. 20 is a graph showing relationship between the dimensions of the respective portions and a sensitivity ratio in a broader range than in FIG. 19.

In a graph of FIG. 20, the sensitivity ratio was measured on the angle a1 of 8°, 10° and 12° over a broader range of the angle d1. The graph teaches that the optimum width of the groove 103A is 28° (viz., d1=28° and c1=12°). The graphs of FIGS. 19 and 20 teach that the optimum width of the window 108a (108b) is 12° (viz., a1=12° and b1=28°). The sensitivity ratio based on these optimum values is improved approximately 50% when comparing with that in the case where the angle d1 is equal to the angle c1 (d1=c1=20°).

The optimum values somewhat vary depending on the material quality and the dimensions of other parts of the torque sensor, but those can readily be measured. Therefore, the optimum values may be obtained by an experiment in the stage of design in actually manufacturing torque sensors.

The above-mentioned embodiment is arranged so as to satisfy the inequalities (11) and (12). As seen from the measuring results of FIGS. 19 and 20, the sensitivity of the torque sensor is improved when comparing with that of the conventional one, if either of the inequalities is satisfied.

In the present embodiment, the input shaft 102 corresponds to a second rotary shaft; the output shaft 103, to a first rotary shaft; the raised parts 103B, to nongroove parts; and the portion of the output shaft 103 surrounded by the tubular member 108, to a surrounded portion.

As seen from the foregoing description, in the fourth embodiment, windows are formed in a tubular member made of conductive and nonmagnetic material, which is rotatable together with a first rotary shaft, a surrounded portion of the second rotary shaft, which is surrounded by the tubular member, is made of magnetic material, grooves, axially extended, are formed in the surrounded portion of the first rotary shaft, the circumferential width of each of the grooves is wider than that of the nongroove part, a change of the overlapping area of each of the windows and the groove associated with the window is measured in terms of electromotive force generated in the coil associated therewith, and a torque generated in the first and second rotary shafts is detected by using the results of the measurement, whereby the sensor sensitivity is improved with an increased impedance change ratio of the coil.

A fifth embodiment of the present invention will next be described.

An overall construction of the fifth embodiment of the present invention is the same as that of the third embodiment so that the same or like components are designated by the same reference numerals and the description thereof will be omitted.

Figure 21:
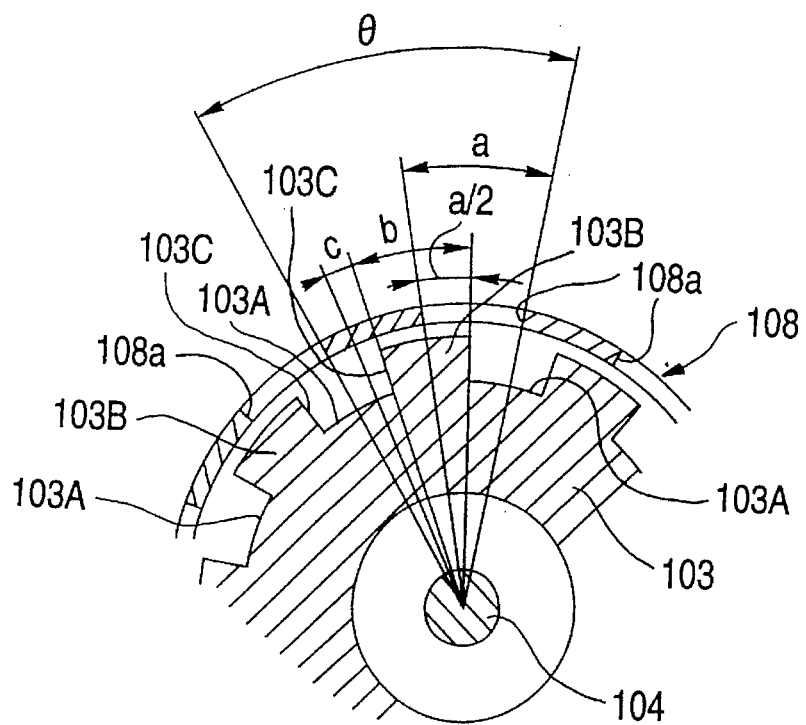
FIGS. 21 and 22 are cross sectional views showing a tubular member and an output shaft in a fifth embodiment.
Figure 22:
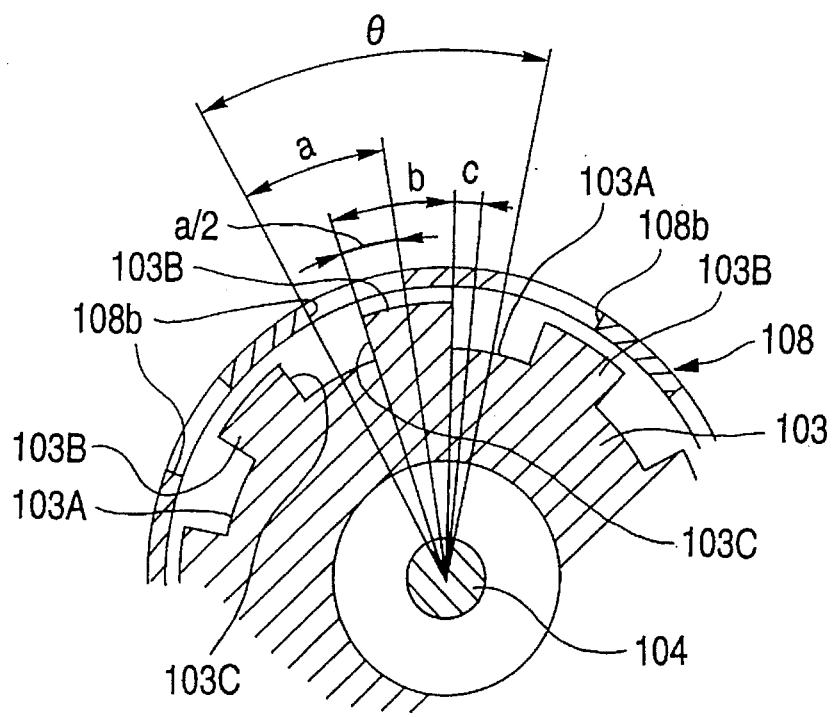

In the present embodiment, side wall 103C of each of the grooves 103A is radially raised from the output shaft 103, as shown in FIGS. 21 and 22 which are cross sectional views. More specifically, the side wall 103C of each of the grooves 103A is raised along a line prolonged from the center of the output shaft 103 (the same as the axial center of the torsion bar 104) in the radial direction.

Assuming that in the angular relationships as shown in FIGS. 21 and 22, the circumferential widths of all the windows 108a, 108b, the grooves 103A and the raised parts 103B are equal to each other, the following equation holds $$a=(\theta-a)=b=(\theta-b)=\theta/2.$$

Since N=9, $$\theta/2=20°.$$

The impedance was measured by properly varying the angles a within the range between 20° and 8° in the state that b is fixed as $$b=(\theta-b)=20°.$$

Figure 23:
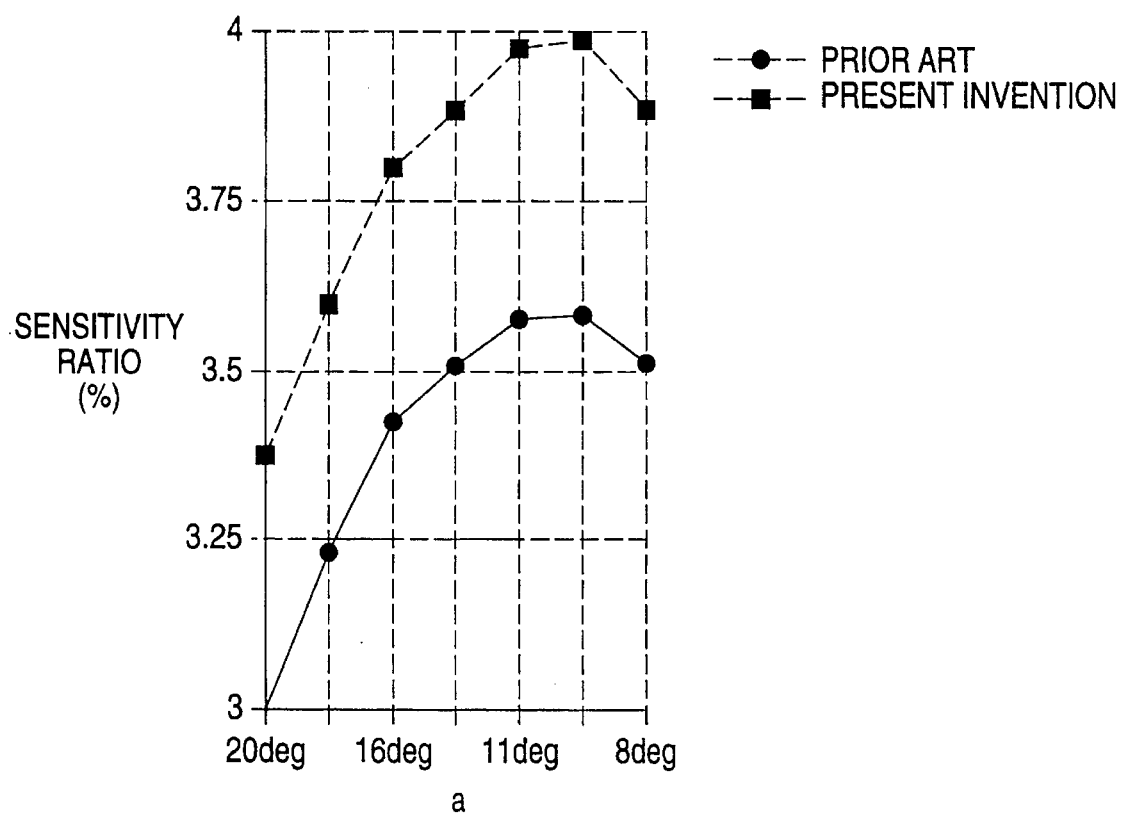
FIG. 23 is a graph comparatively showing a sensitivity ratio of the fifth embodiment of the present invention and that of the conventional one.
Figure 24:
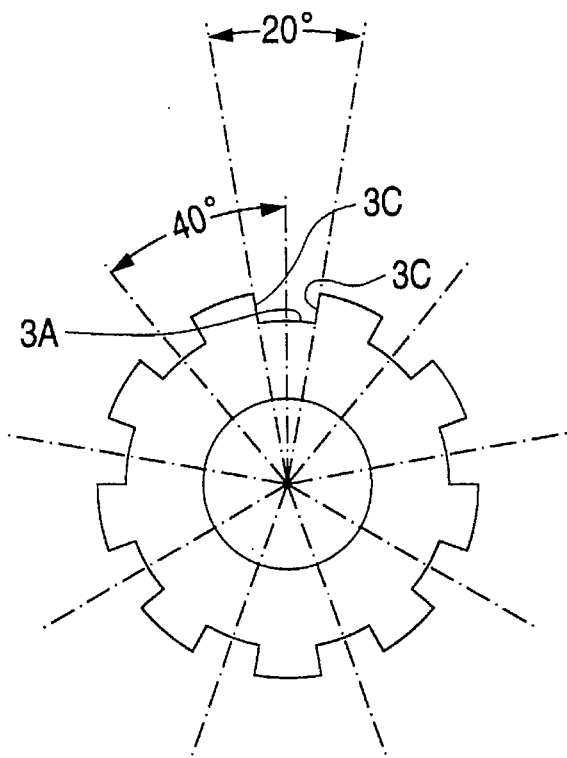
FIG. 24 is a diagram showing the configuration of the grooves of the fifth embodiment of the present invention, which was used in the measurement.
Figure 25:
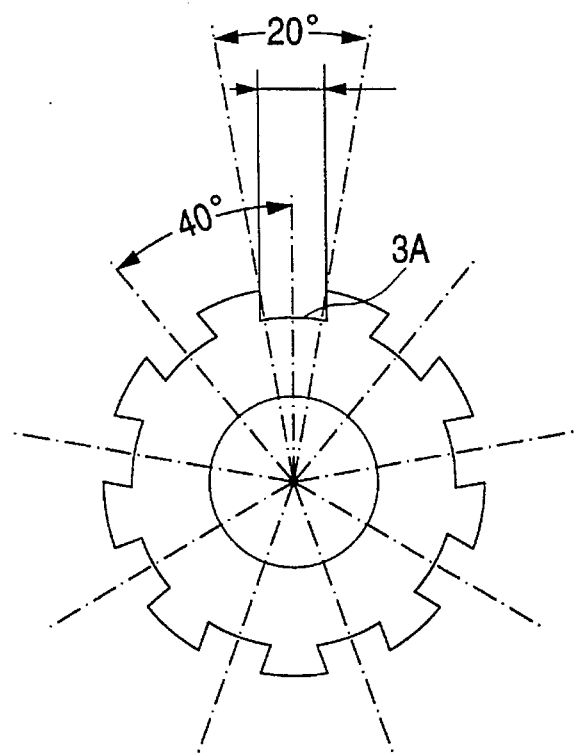
FIG. 25 is a diagram showing the configuration of the grooves of the conventional torque sensor, used in the measurement.

The results of the measurement are as shown in FIG. 23. In FIG. 23, one of two abscissa in FIG. 23 represents measuring results for the case in which the side wall 103C of the groove 103A is raised along the radial direction of the rotary shaft 103 as shown in FIG. 24 (that is, the shape in the present embodiment), and the other represents measuring results for the case in which the groove 103A has a rectangle cross-section as shown in FIG. 25 (prior art). In the structure shown in FIG. 25, the angle of the upper end width of the groove 103A is set to be 20°.

As seen from the graph showing the measurement results, the sensitivity ratio is increased when the side wall 103C is raised along the radial direction of the rotary shaft 103 as compared with the conventional groove shape of the rectangle cross-section (the sensibility is increased by about 10% as compared with the prior art). That is, according to the shape of the present embodiment, since the side wall 103C is raised along the radial direction of the rotary shaft 103, the ratio of change of impedance can be increased to improve the sensibility of the sensor while the material quality or size of other components remains as they are.

The sensitivity of the torque sensor can be increased while leaving unchanged the number of turns of the coils, for example. This fact implies that where no further increase of the sensitivity is required, the sensor size may be reduced by decreasing the number of turns of the coils 110 and 111, and the requirements for the temperature characteristics of electronic parts used may be relaxed or the electronic circuit used may be made insensitive to disturbance by decreasing the gain of the amplifier. The fact that the size reduction of the sensor is possible is very useful particularly when it is applied to the vehicle having a limited space, as in the present embodiment.

FIG. 23 also shows that if the widths of the windows 108a and 108b are properly adjusted, the ratio of sensibility can be further increased. The graph teaches that the optimum widths of the windows 108a and 108b is 12° (that is, a=12°, (θ−a)=28°). The optimum values somewhat vary depending on the material quality and the dimensions of other parts of the torque sensor, but those can readily be measured. Therefore, the optimum values may be obtained by an experiment in the stage of design in actually manufacturing torque sensors.

When the groove 103A is shaped such that the side wall 103C is raised along the radial direction of the rotary shaft 103, the cross-section of the groove 103A has a bottom side narrower than an upper side so that the working of the groove becomes easy. That is, in the conventional shape of the groove as shown in FIG. 25, the groove 103A must be formed by cutting. On the other hand, when the shape of the groove is as shown in FIG. 24, the groove may be easily formed by forging or casting in addition to cutting. Since the options of manufacture process are increased, the cost may be reduced. For example, according to the structure of the shape of this embodiment, since a side surface of the groove 103a to serve as a stopper in the rotation direction is raised along the radial direction of the rotary shaft 103, both the groove 103A and the groove 103a can be formed at the time of forging (cold forging) or casting the rotary shaft 103. Thus, the manufacturing cost can be reduced by the degree that cutting work of the groove 103A becomes unnecessary.

In the present embodiment, the input shaft 102 corresponds to a second rotary shaft; the output shaft 103, to a first rotary shaft; the raised parts 103B, to nongroove parts; and the portion of the output shaft 103 surrounded by the tubular member 108, to a surrounded portion.

As seen from the foregoing description, in the present invention, windows are formed in a tubular member made of conductive and nonmagnetic material, which is rotatable together with a first rotary shaft, a surrounded portion of the second rotary shaft, which is surrounded by the tubular member, is made of magnetic material, grooves, which are axially extended and the sides of which are radially raised from the first rotary shaft when viewed in cross section, are formed in the surrounded portion of the first rotary shaft, a change of the overlapping area of each of the windows and the groove associated with the window is measured in the terms of electromotive force that is generated in the coil associated therewith, and a torque generated in the first and second rotary shafts is detected by using the results of the measurement, whereby the sensor sensitivity is improved with an increased impedance change ratio of the coil.

What is claimed is:

1. A torque sensor, comprising:

a first rotary shaft;

a second rotary shaft disposed coaxially with said first rotary shaft;

a torsion bar for connecting said first rotary shaft to said second rotary shaft;

a tubular member made of conductive and nonmagnetic material, said tubular member being integrally coupled with said second shaft in a rotation direction, while surrounding a circumferential outer surface of said first rotary shaft;

a coil surrounding said tubular member; and electromotive force measuring means for measuring electromotive forces induced in said coil;

wherein at least a surrounded portion of said first rotary shaft, which is surrounded by said tubular member, is made of magnetic material;

wherein said surrounded portion of said first rotary shaft includes axially extended grooves;

wherein said tubular member includes windows such that said windows are arrayed so as to partially overlap with said grooves, respectively, and an overlapping area of said window and said groove is varied in accordance with a relative angular position of said tubular member to said first rotary shaft; and wherein said coil surrounds portions of said tubular member where said windows are formed so that a torque generated in said first and said second shafts is detected on the basis of the measurement result of said electromotive force measuring means.

2. A torque sensor as claimed in claim 1, wherein an axial length of each of said windows is longer than an axial length of said coil but shorter than an axial length of a yoke for holding said coil.

3. A torque sensor as claimed in claim 1, wherein a circumferential width of each of said grooves of said surrounded portion is wider than that of a raised part of said surrounded portion between adjacent ones of said grooves.

4. A torque sensor as claimed in claim 1, wherein a side wall of each of said grooves is raised in a radial direction of said first rotary shaft.

* * * * *